United States Patent
Greenwood et al.

(10) Patent No.: US 12,316,695 B2
(45) Date of Patent: May 27, 2025

(54) METHOD OF PROCESSING A NEW VISITOR SESSION TO A WEB-BASED SYSTEM

(71) Applicant: NETACEA LIMITED, Manchester (GB)

(72) Inventors: Mark Greenwood, Manchester (GB); Matthew Jackson, Manchester (GB); John Modin, Manchester (GB)

(73) Assignee: NETACEA LIMITED, Manchester (GB)

( * ) Notice: Subject to any disclaimer, the term of this patent is extended or adjusted under 35 U.S.C. 154(b) by 0 days.

(21) Appl. No.: 17/998,212

(22) PCT Filed: May 5, 2021

(86) PCT No.: PCT/EP2021/061877
§ 371 (c)(1),
(2) Date: Nov. 8, 2022

(87) PCT Pub. No.: WO2021/228659
PCT Pub. Date: Nov. 18, 2021

(65) Prior Publication Data
US 2023/0239336 A1  Jul. 27, 2023

(30) Foreign Application Priority Data
May 13, 2020 (GB) .................................... 2007046

(51) Int. Cl.
*H04L 67/02* (2022.01)
*G06N 3/08* (2023.01)
*H04L 67/141* (2022.01)

(52) U.S. Cl.
CPC ............. *H04L 67/02* (2013.01); *G06N 3/08* (2013.01); *H04L 67/141* (2013.01)

(58) Field of Classification Search
CPC ... H04L 67/02; H04L 67/141; H04L 63/1425; G06N 3/08; G06F 21/552
See application file for complete search history.

(56) References Cited

U.S. PATENT DOCUMENTS

| | | | |
|---|---|---|---|
| 10,581,991 B1 * | 3/2020 | Wooldridge | ........... G06N 20/10 |
| 2010/0299292 A1 * | 11/2010 | Collazo | ................. G06F 21/577 |
| | | | 706/14 |
| 2020/0099714 A1 | 3/2020 | Haridas et al. | |

FOREIGN PATENT DOCUMENTS

| | | | | |
|---|---|---|---|---|
| WO | WO-2019053234 A1 * | 3/2019 | ......... | G06F 16/9024 |
| WO | 2019063389 A1 | 4/2019 | | |

OTHER PUBLICATIONS

UKIPO, Search Report for corresponding United Kingdom Patent Application No. GB2007046.2, mailed Jan. 15, 2021, 4 pages.

(Continued)

*Primary Examiner* — Cheikh T Ndiaye
(74) *Attorney, Agent, or Firm* — NK Patent Law

(57) ABSTRACT

A method of processing a new visitor session to a web-based system, the method including: for each of a plurality of web requests made to the web-based system in the new visitor session, determining a request vector corresponding to the web request, wherein each request vector is derived from the learned parameters of a trained artificial neural network configured to determine a plurality of probabilities from an input web request or an input sequence of web requests, wherein each of the plurality of probabilities represents a likelihood that, within a session containing the input web request of sequence of web requests, a respective one of a plurality of possible web requests will be requested at one or more predetermined locations before or after the input web request or sequence of web requests; and combining the request vectors to obtain a session vector which characterizes the new visitor session.

14 Claims, 11 Drawing Sheets

(56) References Cited

OTHER PUBLICATIONS

ISA/EP, International Search Report and Written Opinion for corresponding PCT Patent Application No. PCT/EP2021/061877, mailed Jul. 6, 2021, 13 pages.
Lagopoulos, A. et al.: "Web Robot Detection: A Semantic Approach", 2018 IEEE 30th International Conference on Tools with Artificial Intelligence (ICTAI), IEEE, Nov. 5, 2018, pp. 968-974.

* cited by examiner

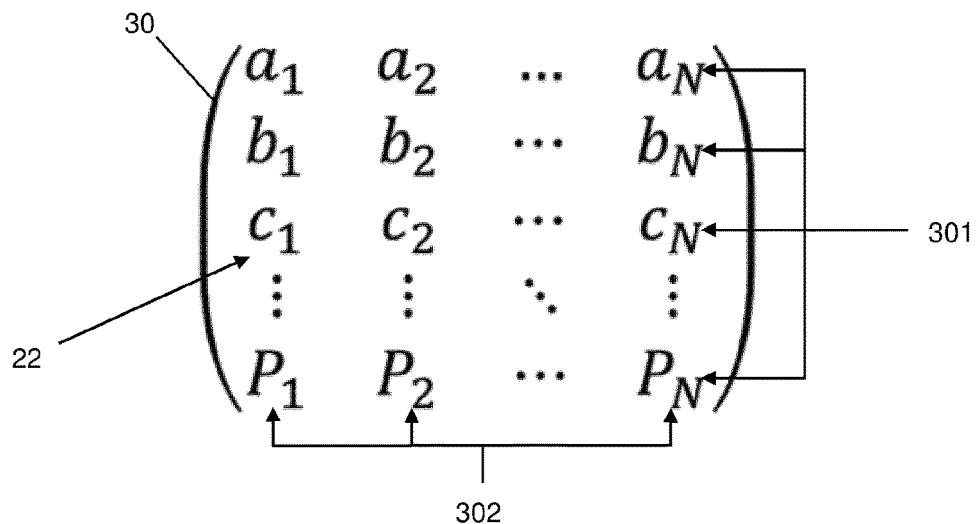
Fig. 3a
$$\vec{v_1} = (a_1, a_2, \cdots, a_N) \qquad \vec{v_2} = (b_1, b_2, \cdots, b_N)$$
$$\vec{v_3} = (c_1, c_2, \cdots, c_N) \qquad \vec{v_P} = (P_1, P_2, \cdots, P_N)$$
Fig. 3b
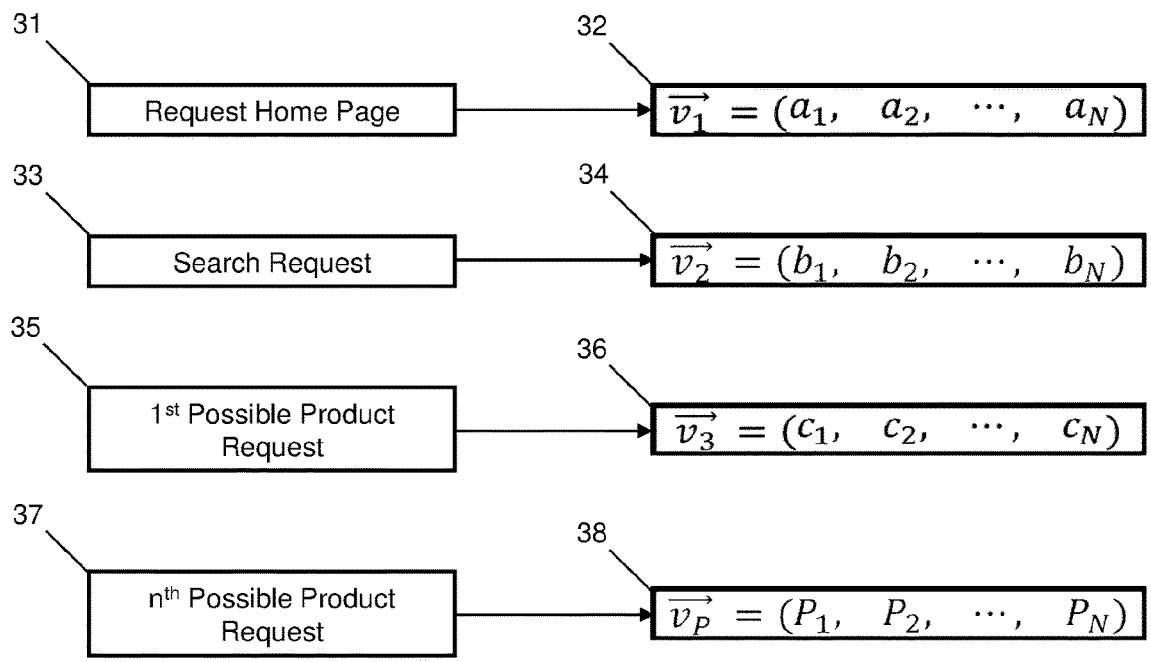
Fig. 3c

METHOD OF PROCESSING A NEW VISITOR SESSION TO A WEB-BASED SYSTEM

CROSS REFERENCE TO RELATED APPLICATIONS

This application is a U.S. National Stage Application of International Patent Application No. PCT/EP2021/061877 entitled "METHOD OF PROCESSING A NEW VISITOR SESSION TO A WEB-BASED SYSTEM" filed on May 5, 2021, which claims priority from United Kingdom Patent Application No. 2007046.2 entitled "METHOD OF PROCESSING A NEW VISITOR SESSION TO A WEB-BASED SYSTEM" filed on May 13, 2020, the entire contents and elements of all of which are herein incorporated by reference for all purposes.

FIELD OF THE INVENTION

The present invention relates to a method of processing a new visitor session to a web-based system and particularly, although not exclusively, to a method for identifying users of a web-based system who are of interest to an administrator of the web-based system. For example, these could be users who are likely to be automated, malicious, or otherwise bad actors seeking to exploit the system for gain.

BACKGROUND

Websites and other web-based systems are targets for abuse by automated processes and malicious visitors. These processes and visitors try to exploit weaknesses in the security and/or logic of web-based systems for commercial or other gain. Exploiting weaknesses in the web-based system can involve making a series of legitimate web requests of the system but in such a way, for example in an unexpected or unorthodox combination of web requests, that a result occurs which is unwanted by or undesirable for an administrator of the web-based system. For example, one such undesirable result is the scraping of a web-based retail system: the retrieval of the details of large numbers of products to be used on a competitor comparison web-based system.

These types of activity cannot be stopped using traditional web-security products as such products are conventionally focused on identifying illegitimate web requests being made that exploit weaknesses in the underlying program code or platform code of the web-based system.

One possible approach for unwanted and undesirable requests discussed above is to implement software on devices which identify a new visitor as an automated process and/or a malicious visitor. However, sophisticated attackers are now able to evade identification.

The present inventors have identified it would be desirable to provide a solution that can identify automated and/or malicious processes based on server-side activity, amongst other processes.

WO 2019/063389 discloses a method of processing web requests directed to a website.

The present invention has been devised in light of the above considerations.

SUMMARY OF THE INVENTION

A first aspect of the present invention may provide: a method of processing a new visitor session to a web-based system, the method including: for each of a plurality of web requests made to the web-based system in the new visitor session, determining a request vector corresponding to the web request; wherein each request vector is derived from the learned parameters of a trained artificial neural network configured to determine a plurality of probabilities from an input web request or an input sequence of web requests; wherein each of the plurality of probabilities represents a likelihood that, within a session containing the input web request or sequence of web requests, a respective one of a plurality of possible web requests will be requested at one or more predetermined locations before or after the input web request or sequence of web requests; and combining the request vectors to obtain a session vector which characterizes the new visitor session.

Here, the plurality of possible web requests can be understood as a plurality of web requests that might be requested at the one or more predetermined locations. For the avoidance of any doubt, the plurality of possible web requests need not be the same as all possible web requests since, for example as discussed in more detail below, some web requests may be disregarded from the data used to train the artificial neural network, and some web requests directed to different content may be deemed to be the same (and thus may count as one possible web request).

The present inventors have found that obtaining a session vector determined as above is able to facilitate providing an administrator of the web-based system with new and useful insights into the nature of the new visitor session, that would not be as easily realized using prior art methods.

The process of deriving a request vector corresponding to a particular web request may interchangeably be referred to herein as embedding a web request to a given request vector. The person skilled in the art would understand this to be a specific implementation of the more widely known process of token embedding, and would be aware of a number of different methods by which token embedding can be performed. For example, schemes of token embedding which could be implemented are one-hot encoding, one-cold encoding, or more preferably word embedding.

As can be seen from the discussion below, the new visitor session can be processed based on the session vector, which may be useful in, for example, ensuring the security of the web-based system against entities with malicious intent against an administrator of the web-based system (or the web-based system itself), or informing an administrator of the web-based system about the typical behaviours of visitors to the web-based system.

Entities with malicious intent are herein referred to interchangeably as malicious visitors or bad actors.

In some examples, data representing the new visitor session may be pre-processed to provide the data in a normalized form, preferably before determining the request vectors.

For the avoidance of any doubt, request vectors could be determined for all web requests made to the web-based system in the new visitor session. However, in some or indeed many cases, request vectors may be determined for each of only a subset of the web requests made to the web-based system. For example, as discussed in more detail below, some web requests may be disregarded as a part of pre-processing.

As another example, request vectors may only be determined for web requests made within a predetermined time period. For example, request vectors may only be determined for web requests made in the preceding 10 minutes or less, 30 minutes or less, 1 hour or less, 4 hours or less, 1 day or less, or 1 week or less.

Preferably, the trained artificial neural network, the learned parameters of which are used to derive the request vector corresponding to each web request, is trained in accordance with a second aspect of the invention, as discussed below.

In some examples, the trained artificial neural network is a feedforward neural network. In some examples, the trained artificial neural network is a recurrent neural network. In some examples, the trained artificial neural network is a Long Short-Term Memory network. In some examples, the trained artificial neural network may implement a hidden Markov model.

Preferably, combining the request vectors to obtain a session vector which characterizes the new visitor session includes: adding the requests together.

In this way, the request vectors may be efficiently combined via a series of simple logic operations to obtain a session vector which contains information that is an aggregation of the information that can be determined from each of the individual request vectors which have been combined to obtain the session vector.

The request vectors may be added together by performing vector addition.

The added request vectors may then be averaged, e.g. by calculating the mean of the added request vectors. This may facilitate comparison with other session vectors which have been calculated for other visitor sessions from a different number of request vectors. This may also help to constrain the magnitude of the vector space inhabited by the session vector, thus ensuring a high efficiency of any computations that are necessary for processing the new visitor session.

Preferably, processing the new visitor session to the web-based system further includes: updating the session vector with new request vectors corresponding to new web requests made in the new visitor session.

For example, the session vector may be updated based on a moving time window, e.g. the session vector may comprise web requests corresponding to all web requests made in the immediately preceding 10 minutes or less, 30 minutes or less, 1 hour or less, 4 hours or less, 1 day or less, or 1 week or less.

Additionally or alternatively, the session vector may be updated such that it comprises a predetermined number of request vectors. For example, the session vector may be determined by the combination of request vectors corresponding to a predetermined number of the most recent web requests, e.g. the 10 or fewer most recent web requests, the 20 or fewer most recent web requests, the 50 or fewer most recent web requests, or the 100 or fewer most recent web requests.

Additionally or alternatively, the new visitor session may have a determined starting point. In some examples, all web requests which are made after the determined starting point are embedded to respective request vectors. The determined starting point may be a calendar date and/or time of interest to an administrator of the web-based system. For example, an administrator of the web-based system may wish to process visitor sessions made at a particular time of year, e.g. during the month of December. Additionally or alternatively, the determined starting point may be determined based on information obtained from HTTP cookies exchanged between the machine from which the new visitor session is being conducted and the web-based system. For example, the determined starting point may be determined based on data obtained from a cookie which indicates the start time of a new visitor session, wherein the visitor conducting the new visitor session has logged on to the web-based system at the start time of the new visitor session. The skilled person will be aware of many types of HTTP cookie which are appropriate for providing information indicative of the starting point of a visitor session; for example session cookies or tracking cookies may be considered as suitable options.

In this way, information can be provided to an administrator of the web-based system that is up to date.

Preferably, processing the new visitor session to the web-based system further includes: pre-processing web requests in the new visitor session by disregarding one or more web requests deemed not of interest.

In some cases, the pre-processing performed on the web requests will be the same pre-processing that is performed on the data used to train the artificial neural network in accordance with some embodiments of the second aspect of the invention, as described below.

In some examples, it is an administrator of the web-based system who determines if a web request is deemed of interest or not of interest. In other examples, a software programmer who wrote software which implements the method of the first aspect of the invention who determines if a web request is deemed of interest or not of interest. In some examples, a criterion for determining if a web request is deemed of interest or not of interest is predetermined.

Web requests may be deemed not of interest (disregarded) because said web requests are made with a frequency below a predetermined threshold. The predetermined threshold may be 1 time a day or less, 1 time a week or less, 10 times a week or less, 1 time or less in a visitor session, 2 times or less in a visitor session, 5 times or less in a visitor session, or 10 times or less in a visitor session.

Web requests may be deemed not of interest because they correspond to content of the web-based system which an administrator of the web-based system deems to be not of interest. For example, the administrator of a web-based system configured for selling clothing may determine that requests directed to content corresponding to winter clothing such as skiing equipment is not of interest during the summer months, e.g. June, July, or August in the northern hemisphere.

In this way the efficiency of the processing of new visitor sessions can be increased by not expending processing time or power on web requests which are deemed not of interest. Importantly, pre-processing as described above can help to ensure that the processing of the new visitor session is based on the best possible representation of the web requests which are typically made in a visitor session to the web-based system.

Preferably, disregarding a web request deemed not of interest involves setting the request vector for the web request to be a null vector.

A null vector can be understood to be a vector wherein all of the elements of the vector have a zero value.

In this way, web requests which are disregarded can be processed in the same way as other web requests, because a null vector will not contribute to the magnitude or orientation of the session vector when all of the request vectors are combined to produce the session vector. This can serve to increase the efficiency of processing the new visitor session by removing a potential requirement to maintain two separate processing paths based on whether a web request has been disregarded or not.

Preferably, processing the new visitor session to the web-based system further includes: monitoring disregarded web requests; and initiating a retraining of the artificial neural network based on the monitoring of the disregarded web requests.

In some examples, the retraining of the artificial neural network is initiated if it is determined that a predetermined proportion of the web requests of the new visitor session (over a predetermined period of time, or over a predetermined number of web requests) are web requests which are disregarded. In some examples, the predetermined proportion is 5% or more, 10% or more, 20% or more, 25% or more.

In some examples, the retraining of the artificial neural network is initiated if it is determined that a predetermined number of the web requests of the new visitor session are web requests which are disregarded. In some examples, the predetermined number is 10 or more, 20 or more, 50 or more, or 100 or more.

In some examples, the retraining of the artificial neural network is initiated if it is determined that the proportion of web requests of the new visitor session that are disregarded differs from an average proportion by a predetermined factor. In some examples, the average proportion may be a proportion selected by an administrator of the web-based system, for example 5% or less, 10% or less, 15% or less, or 20% or less. In other examples, the average proportion may be determined by determining the average proportion of web requests from one or more other visitor sessions which were disregarded. The predetermined factor may be a difference of 2% or more, 5% or more, 10% or more, 15% or more, 20% or more, or 50% or more.

In some examples, the monitoring of disregarded web requests may be conducted over a predetermined moving time window. For example, only requests made within the preceding 1 hour, preceding 6 hours, preceding 12 hours, preceding 48 hours, or preceding 72 hours may be considered when determining if it is necessary to initiate the retraining of the artificial neural network.

In some examples, the monitoring of disregarded web requests may be conducted over a predetermined number of web requests, e.g. a predetermined of the most recent web requests. For example, only the 10 or fewer most recent web requests within a visitor session, 20 or fewer most recent web requests within a visitor session, 50 or fewer most recent web requests within a visitor session, or 100 or fewer most recent web requests within a visitor session may be considered when determining if it is necessary to initiate the retraining of the artificial neural network.

In this way, it is possible to mitigate the risk of concept drift reducing the accuracy of the results of the method in accordance with some embodiments of the first aspect of the present invention. Concept drift can be understood to mean the gradual change, over time, of the nature of web requests, such that web requests which were deemed not of interest may become of interest because, for example, they are being requested more frequently, or the circumstances of interest to the owner and/or administrator of the web-based system have changed. By initiating a re-training of the artificial neural network, if a sufficiently large concept drift occurs, it is possible to maintain the accuracy of the method in accordance with some embodiments of the first aspect of the present invention by ensuring that the learned parameters of the trained artificial neural network, from which the request vectors are derived, can be used to accurately determine a plurality of probabilities from an input web request or an input sequence of web requests; wherein each of the plurality of probabilities represents a likelihood that, within a session containing the input web request or sequence of web requests, a respective one of a plurality of possible web requests will be requested at one or more predetermined locations before or after the input web request or sequence of web requests.

Preferably, processing the new visitor session to the web-based system further includes: pre-processing web requests in the new visitor session by handling web requests which are directed to different content in the web-based system, but are deemed to be similar, such that the request vectors corresponding to the web requests deemed to be similar are identical.

In some cases, the pre-processing performed on the web requests will be the same pre-processing that is performed on data used to train the artificial neural network in accordance with some embodiments of the second aspect of the invention, as described below.

In some examples, it is an administrator of the web-based system who determines if different web requests are deemed similar or not similar. In other examples, it is a software programmer who wrote software which implements the method in accordance with the first aspect of the present invention who determines if different web requests are deemed similar or not similar. In some examples, a criterion for determining if different web requests are deemed similar or not similar is predetermined.

Some pre-processing may be performed to allow the same processing method to be applied to a variety of different visitor sessions. In this way, web requests made in different visitor sessions which are conceptually similar may be processed in the same way, regardless of specific differences between the requests, for example having different character strings representing conceptually similar requests.

A specific illustrative example might be "Contents" and "Menu" being different strings with a conceptually similar meaning underlying the request.

As an additional illustrative example, two visitors to a web-based system, "Alice" and "Bob" might request their respective user profiles on the web-based system named "Alice profile" and "Bob profile" respectively. The pre-processing may be performed such that the request vectors corresponding to the two web requests are identical, since they are both web requests for a user profile.

As an additional illustrative example, a web-based system which allows users to search for food recipes may pre-process web requests for "penne pasta recipes" and "spaghetti pasta recipes" such that they have an identical request vector corresponding to web requests for "pasta recipes".

In this way, web requests which are highly variable but conceptually similar, i.e. directed to similar content, may contribute to the same request vector, thus allowing the data to be used in a meaningful way, which may in turn help an administrator of the web-based system to improve their understanding of the possible intentions of visitors to the web-based system. For example, the variability may be alphanumeric variations in the characters of strings corresponding to the web requests. These alphanumeric variations may arise from, for example, web requests associated with one of a plurality of usernames, wherein each username is unique to each visitor to the web-based system. Web requests corresponding to the plurality of usernames could be deemed to be conceptually similar, but could be expected to exhibit a high degree of variation. Accordingly, allocating them all the same request vector helps make the best of the data available, and may improve the owner and/or administrator's understanding of the intentions of the visitors to the web-based system.

In general, when determining whether web requests are deemed similar or not similar, there is a balance to be struck between wanting many examples of each request vector to train the model so that the model is able to provide useful insights (which points to treating the web requests as identical), without oversimplifying the number of possible web requests available thereby potentially throwing away useful insights (which points to not treating the web requests as identical). For example, if there were enough examples of web requests for "penne pasta recipes" and "spaghetti pasta recipes", it may not be desirable and/or necessary to use a single request vector for "pasta recipes".

Web requests directed to different content but deemed to be similar may be viewed as relating to one possible web request, for the purposes of this disclosure.

Preferably, processing the new visitor session to the web-based system further includes: processing the new visitor session based on the session vector.

In this way, the new and useful insights into the nature of the new visitor session that can be gleaned from obtaining the session vector, and would not be as easily realized using prior art methods, can be used to determine how the new visitor session should be processed, e.g. in accordance with the needs of an administrator of the web-based system.

Preferably, processing the new visitor session includes comparing the session vector to a reference session vector corresponding to another visitor session, wherein comparing the session vector to the reference session vector includes: determining one or more parameters indicative of the similarity between the session vector and the reference session vector; and if the determined one or more parameters meets a predetermined criterion indicating that the session vector and reference session vector are adequately similar, identifying the new visitor session as being similar to the other visitor session.

In some examples, the predetermined criterion is determined by an administrator of the web-based system. In some examples, the predetermined criterion is determined by a software programmer who wrote software which implements the method of the first aspect of the claimed invention.

In some examples, comparing the session vector to the reference session vector corresponding to the other visitor session further includes: if the determined one or more parameters indicative of the similarity between the session vector and the reference session vector fails to meet the predetermined criterion indicating that the session vector and reference session vector are adequately similar, identifying the new visitor session as being different from the other visitor session.

In some examples, the one or more parameters include an angle between the session vector and the reference session vector in the vector space inhabited by the session vector and the reference session vector (which, for the avoidance of any doubt, need not be 2D or 3D space). This angle may be determined by determining the cosine similarity between the session vector and the reference session vector. The cosine similarity of any two vectors can be understood to be the cosine of the angle between the two vectors in vector space. In some examples, this can be determined, in a general way, by determining the quotient of the inner product of the two vectors with the product of the absolute values of said two vectors. In such examples, the predetermined criterion may be a threshold such that if the cosine similarity between the session vector and the reference session vector is above a predetermined threshold, the predetermined criterion is deemed to have been met. In other words, if the angle between the session vector and the reference session vector is below a predetermined threshold, the predetermined criterion is deemed to have been met.

By using the cosine similarity as a parameter which characterizes the similarity between the session vector and the reference session vector, potential error related to differences in the magnitudes of the two vectors can be avoided, as the cosine similarity considers only the direction of orientation of the two vectors within the vector space that they inhabit.

Additionally or alternatively, in some examples, the one or more parameters may include the distance between the session vector and the reference session vector. The distance may be determined by determining the Euclidean distance between the session vector and the reference session vector in the vector space inhabited by the session vector and the reference session vector (which, for the avoidance of any doubt, need not be 2D or 3D space). In such examples, if the Euclidean distance between the session vector and the reference session vector is below a predetermined threshold, the predetermined criterion is deemed to have been met.

By using the Euclidean distance as a parameter which characterizes the similarity between the session vector and the reference session vector, additional information about the similarity between the session vector and the reference session vector can be obtained. For example, using the Euclidean distance as a parameter may enable an administrator of the web-based system to determine if one or more sections of the new visitor session share a common web request path with one or more sections of the reference visitor session. Further, by including information about the magnitude of the session vector and the reference session vector, as can be inferred from a determination of the Euclidean distance between the session vector and the reference session vector, information about the quantity of web requests made in visitor sessions can be obtained.

In some examples, the visitor session corresponding to the reference session vector is a visitor session which has been processed in accordance with the method of the first aspect of the present invention. In other examples, the visitor session corresponding to the reference session vector may be a representative example of a known type of visitor session selected by an administrator of the web-based system. For example, the known type of visitor session may correspond to a type of visitor to the web-based system with whom an administrator of the web-based system wants to communicate targeted information. Additionally or alternatively, the known type of visitor session may correspond to a visitor who is deemed to be a bad actor.

In some examples, the reference session vector is one of a plurality of reference session vectors, wherein each of the plurality of reference session vectors characterize one of a plurality of other visitor sessions to the web-based system.

In some examples, the predetermined similarity threshold for each of the respective plurality of reference session vectors has a different value. In this way, actions can be taken based on an administrator's intentions with respect to different types of visitor session. For example, the threshold for identifying a new visitor session as corresponding to a bad actor may require less similarity than the threshold for identifying a new visitor session as corresponding to a potential advertising target. An administrator may be able to vary the thresholds according to need/appetite for risk.

Preferably, processing the new visitor session includes taking one or more predetermined actions in response to further web requests in the new visitor session, based on the new visitor session being identified as similar to the other visitor session.

The one or more predetermined actions may include, for example, one or more security actions. This may be appropriate if the other visitor session was identified as a bad actor, or a bot, for example.

The one or more security actions may include, for example, blocking one or more users associated with the new visitor session, or blocking any future sessions which fall within the "footprint" of the new visitor session. The footprint of a visitor session can be understood to be the region of the session vector space within which a new visitor session is classified as being similar to the visitor session whose footprint is being considered.

The one or more security actions may include, for example, redirecting one or more users associated with the new visitor session through a verification procedure to verify that they are not a "bot", or redirecting any future session which fall within the footprint of the new visitor session through a verification procedure to verify that they are not a "bot". The verification procedure may be a CAPTCHA (Completely Automated Public Turing test to tell Computers and Humans Apart) test, for example. The skilled person would be aware of many alternative verification procedures which could be implemented to verify that the user is not a "bot", or another type of bad actor.

The one or more security actions may include, for example, sending one or more users "false" content. False content can be understood to be content which does not contain information relevant to the web request made by a visitor. In this way, a visitor identified as a bad actor can be prevented from accessing content which an administrator of the web-based system wants to prevent them from accessing.

The one or more predetermined actions may include, delivering one or more targeted messages to the visitor conducting the new visitor session. This may be appropriate if the other visitor session was identified as a potential advertising target, for example.

The targeted message may, for example, be a suggestion to include a request for a particular section of the web-based system in the visitor session which an administrator of the web-based system has determined may be of interest to the visitor.

Preferably, the one or more actions are implemented automatically without offering a manual prompt to an administrator of the web-based system.

In this way, processing new visitor sessions can be substantially automated without needing to analyse the specific alphanumeric character strings involved in the web requests of the new visitor session.

Preferably, processing the new visitor session further includes: determining one or more parameters indicative of the similarity between the session vector and each of a plurality of reference session vectors, wherein each of the plurality of reference session vectors corresponds to a respective other visitor session; and grouping the new visitor session with each other visitor session for which the respective one or more determined parameters meets a predetermined criterion indicating that the session vector and the reference session vector corresponding to that other visitor session are adequately similar.

In this way an administrator of the web-based system is able to obtain information about multiple visitor sessions which can all be considered to be similar, and therefore can be processed in a similar manner based on the insights into the nature of the visitor sessions which are inferred from their respective session vectors.

In some examples, the predetermined criterion is determined by an administrator of the web-based system. In other examples, the predetermined criterion is determined by a software programmer who wrote software which implements the method in accordance with the first aspect of the present invention.

In some examples, the one or more parameters include the respective angle between the session vector and each of the plurality of reference session vectors. The respective angle may be determined by determining the respective cosine similarity between the session vector and each of the plurality of reference session vectors. In such examples, the respective predetermined criterion may be a threshold such that if the respective cosine similarity between the session vector and each of the plurality of reference session vectors is above a respective predetermined threshold, the respective predetermined criterion is deemed to have been met. In other words, if the respective angle between the session vector and each of the plurality of reference session vectors is below a respective predetermined threshold, the respective predetermined criterion is deemed to have been met.

By using the respective cosine similarity as a parameter which characterizes the similarity between the session vector and each of the plurality of reference session vectors, potential error related to differences in the magnitudes of the vectors can be avoided, as the cosine similarity between any two vectors considers only the direction of orientation of the two vectors within the vector space that they inhabit.

Additionally or alternatively, the one or more parameters includes the respective distance between the session vector and each of the plurality of reference session vectors. Each respective distance may be determined by determining the respective Euclidean distance between the session vector and each of the plurality of reference session vectors. In such examples, if the respective Euclidean distance between the session vector and each of the plurality of reference session vectors is below a respective predetermined threshold, the respective predetermined criterion is deemed to have been met.

By using the respective Euclidean distance as a parameter which characterizes the similarity between the session vector and each of the plurality of reference session vectors, additional information about the respective similarity between the session vector and each of the plurality of reference session vectors can be obtained. For example, using the respective Euclidean distance as a parameter may enable an administrator of the web-based system to determine if one or more sections of the new visitor session share a common web request path with one or more sections of each of the plurality of reference visitor sessions. Further, by including information about the magnitudes of the session vector and the plurality of reference session vectors, as can be inferred from a determination of the respective Euclidean distance between session vector and each of the plurality of reference session vectors, information about the quantity of web requests made in new visitor sessions can be obtained.

In some examples, one or more of the visitor sessions corresponding to each of the plurality of reference session vectors are visitor sessions which have been processed in accordance with the method of the present invention. In other examples, one or more of said visitor sessions may be representative examples of a known type of visitor session selected by an administrator of the web-based system. For example, the known type of visitor session may correspond to a type of visitor to the web-based system with whom the owner and/or administrator of the web-based system wants to communicate targeted information. Additionally or alternatively, the known type of visitor session may correspond to a visitor who is deemed to be a bad actor.

In some examples, the respective predetermined similarity threshold for each of the plurality of reference session vectors has a different value. In this way, actions can be taken based on an administrator's intentions with respect to different types of visitor session. For example, the threshold for identifying a new visitor session as corresponding to a bad actor may be less similar for an administrator of a web-based system who is more cautious regarding web-based security than an administrator of a web-based system with a correspondingly larger appetite for risk.

Processing the new visitor session may include, for example, processing all visitor sessions which are grouped as being similar in the same way. In this way, processing new visitor sessions can be substantially automated without needing to analyse the specific alphanumeric character strings involved in the web requests of the new visitor session.

Preferably, processing the new visitor session further includes: providing a graphical user interface configured to present information regarding the new visitor session to a user, wherein the information regarding the new visitor session is based at least in part on the session vector.

In this way, the user of the graphical user interface can easily obtain information about one or more visitor sessions to the web-based system to better understand the visitor traffic that the web-based system is subject to.

In some examples, the graphical user interface provides information regarding a group of visitor sessions, for example a plurality of session vectors which have been grouped, as discussed above, based on the respective one or more parameters which characterize the similarity between the session vector and each of the one or more reference session vectors respectively corresponding to each of the one or more other visitor sessions.

Preferably, the graphical user interface is further configured to: if the new visitor session has been processed based on the session vector, inform the user of the graphical user interface how the new visitor session has been processed based on the session vector.

In some examples, the graphical user interface is configured to allow and/or prompt a user to take one or more predetermined actions relating to the new visitor session, optionally the group of visitor sessions, based at least in part on the session vector within the session vector space.

In some examples, the graphical user interface may inform the user of the graphical user interface how a plurality of new visitor sessions have been processed based on the respective session vectors.

In some examples, the graphical user interface may further present contextual information to the user of the graphical user interface. In some examples, the contextual information may include, e.g. an IP address corresponding to the IP address from which the new visitor session originates, information indicative of the time of the start of the new visitor session, information indicative of the duration of the new visitor session and/or information indicative of the geographical location from which the new visitor session was conducted by the visitor to the web-based system.

In this way the information obtained by processing one or more new visitor sessions in accordance with the method described above can be presented to an administrator of the web-based system in a manner which makes it easier for an administrator to identify patterns and/or groups of visitor sessions.

The one or more predetermined actions may include, for example, one or more security actions (e.g. as discussed above).

The one or more predetermined actions may include delivering one or more targeted messages to the visitor conducting the new visitor session (e.g. as discussed above).

Preferably, the one or more predetermined actions are implemented automatically without offering a manual prompt to an administrator and/or owner of the web-based system.

Preferably the learned parameters of the trained artificial neural network are arranged into a numerical array, wherein each request vector is derived from a row or column of the numerical array.

The trained artificial neural network may comprise one or more hidden layers of nodes. Preferably, the trained artificial neural network comprises one hidden layer of nodes.

The dimensions of the numerical array may be determined by the size of the trained artificial neural network. In some examples, the number of columns of the numerical array is determined to be the number of nodes within a hidden layer of the trained artificial neural network. The number of columns of the numerical array preferably corresponds to the number of dimensions of the vector space into which each web request is embedded as a request vector.

The number of dimensions of the vector space may correspond to the number of nodes within the one or more hidden layers of the trained artificial neural network.

In some examples the number of rows of the numerical array is determined to be the number of possible web requests which can be requested in a visitor session.

In some examples the number of rows of the numerical array is determined to be the number of web requests which are deemed to be of interest as described above. In other words, web requests which are deemed to not be of interest as described above may not have a corresponding row in the numerical array.

In some examples, a plurality of web requests in the new visitor session which are directed to different content in the web-based system, but are deemed to be similar, then that plurality of web requests deemed to be similar may have a single row of the numerical array.

In this way, each row of the numerical array can easily be extracted to form a request vector corresponding to a respective web request.

Preferably, the number of dimensions of the vector space is fewer than the number of possible web requests. In other words, preferably the number of columns of the numerical array is fewer than the number of rows of the numerical array.

By constructing the numerical array using the learned parameters of a trained artificial neural network, the density of the numerical array may be higher than those constructed with conventional methods, e.g. one-hot encoding. The density of a numerical array can be understood to be the fraction of elements of the numerical array which are non-zero.

In this way, the trained artificial neural network may contain connections between each input web request (preferably after pre-processing as described above) and each of the nodes within the one or more hidden layers of the trained artificial neural network. Each element of the numerical array may correspond to a weight of a connection between a given input web request and a given node. In this way a dense numerical array can be constructed by arranging the weights for each connection in the trained artificial neural network into the numerical array.

In some examples, the density of the numerical array corresponds to the fraction of connections in the trained artificial neural network with a non-zero weight.

In some examples, the number of columns of the numerical array, and correspondingly the number of dimensions into which the request vectors are embedded is 50 or more, 75 or more, 100 or more, 150 or more, 200 or more, 250 or more, 300 or more, and at any rate not equal to or greater than the number of possible web requests that can be requested in a visitor session.

For avoidance of any doubt, the terms "column" and "row" may be interchanged in the above discussion. That is, in some examples, the number of rows of the numerical array is determined to be the number of nodes in a hidden layer within the artificial neural network and the number of columns of the numerical array is determined to be the number of possible web requests which can be requested in a visitor session.

In some examples, the vector space which is inhabited by the request vectors and session vectors is a Euclidean vector space. However, the skilled person will be aware of alternative geometries which are appropriate constructions for the vector space. For example, hyperbolic vector spaces may be an appropriate construction. In particular, in some examples, the vector space may be a multidimensional Poincaré sphere.

In some examples the density of the numerical array is 0.85 or more, 0.9 or more, 0.95 or more, 0.99 or more, or more preferably 1.

The inventors have found that by constructing the numerical array in the manner described above that the learned parameters of the neural network can be arranged such that the resulting request vectors that are extracted from the numerical array are non-orthogonal. The inventors have found that increasing the degree of non-orthogonality between request vectors allows for a greater degree of conceptual similarity between web requests to be inferred.

This is found to contrast with conventional methods of numerical array construction. For example, if the numerical array were constructed with one-hot encoding, the numerical array would have non-zero elements only along the first diagonal of the numerical array and thus all request vectors would be orthogonal, meaning that no conceptual similarity between web requests could be inferred.

Preferably, the method in accordance with the first aspect of the invention is performed for each of a plurality of new visitor sessions to the web-based system to obtain a respective session vector which characterizes each of the plurality of new visitor sessions.

In some examples, processing a plurality of new visitor sessions in accordance with the method described above includes ranking the plurality of new visitor sessions according to the degree of similarity between each of the plurality of new visitor sessions and the reference session vector discussed above. The degree of similarity between each of the plurality of new visitor sessions and the reference session vector discussed above may be determined by determining the respective one or more parameters which characterize the similarity between each of the plurality of session vectors corresponding to each of the plurality of new visitor sessions and the reference session vector corresponding to the other visitor session.

In this way, an administrator of the web-based system may adjust the size of the footprint of the other session vector such that a predetermined number of session vectors are classified as similar to the other session vector. For example, the predetermined number of session vectors classified as similar to the other session vector may be 1 or more, 10 or more, 100 or more, 1000 or more.

A method according to a first aspect of the invention may, in some examples, be viewed as implementing an unsupervised computer algorithm. The algorithm is preferably unsupervised in the same sense that a machine learning algorithm can be thought of as unsupervised. That is, the method is a self-organised method which may be able to detect previously unknown patterns in a dataset without being constrained by one or more predefined labels, or predetermined outputs.

A second aspect of the invention may provide: a method for training an artificial neural network, the method including: providing an artificial neural network configured to determine a plurality of probabilities from an input web request or sequence of web requests made to a web-based system, wherein each of the plurality of probabilities represents a likelihood that, within a visitor session to the web-based system containing the input web request or sequence of web requests, a respective one of a plurality of possible web requests will be requested at one or more predetermined locations before or after the input web requests or sequence of web requests; and training the artificial neural network using data representing a plurality of visitor sessions to the web-based system.

The trained artificial neural network of the first aspect of the invention is preferably obtained by a training method as set out in the second aspect of the invention, preferably with data representing a plurality of visitor sessions to the web-based system of the first aspect of the invention used to train the artificial neural network in accordance with the second aspect of the invention.

In this way, a bespoke artificial neural network can be trained in accordance with the second aspect of the invention and provided such that a method of processing new visitor sessions to a web-based system in accordance with the first aspect of the invention can be implemented efficiently and accurately, with minimal need for manual user input. This is also a convenient arrangement for permitting re-training of the artificial neural network.

The artificial neural network may comprise one or more layers of nodes. Each layer may comprise one or more nodes. Weights and biases may respectively be associated with each node. The general structure of an artificial neural network comprising the abovementioned elements is well known to a person skilled in the art of machine learning.

Preferably, the number of nodes within a hidden layer of nodes of the artificial neural network corresponds to the number of dimensions into which web requests are embedded as requests in accordance with some embodiments of the first aspect of the invention.

The number nodes of the artificial neural network may be, for example, 50 or more, 100 or more, 150 or more, 200 or more, 300 or more.

In some examples, the artificial neural network is trained by implementing a machine learning algorithm, using the training data, for one or more training iterations. In some examples, the number of training iterations is 1 or more, 5 or more, 10 or more. In some examples, the training of the artificial neural network is reiterated until the accuracy of the artificial neural network meets a predetermined criterion. In some examples, the predetermined criterion is an accuracy threshold such that the training of the artificial neural network is deemed to be complete once the accuracy of the artificial neural network is above a predetermined threshold. In other examples, the predetermined criterion is that the error of the artificial neural network is determined to have been reduced to a minimum. In other words, the predetermined criterion may be that the accuracy of the artificial neural network is determined to have been increased to a maximum. In some examples, the accuracy of the artificial neural network may be deemed to have been increased to a maximum, if the accuracy of the artificial neural network does not increase for a predetermined number of iterations. The predetermined number of training iterations may be 1 or more, 2 or more, 5 or more, 10 or more. In some examples, the accuracy of the artificial neural network may be deemed to have been increased to a maximum if the artificial neural network meets a predetermined convergence criterion. The convergence criterion may be for example, that the derivative of the accuracy of the artificial neural network with the number of training iterations falls below a predetermined threshold.

Preferably the artificial neural network is trained with supervised or, optionally, semi-supervised learning techniques. Such techniques would be well known to a person skilled in the art of machine learning.

Preferably, training the artificial neural network further includes: pre-processing the data representing a plurality of visitor sessions to the web-based system before using that data to train the artificial neural network.

Preferably the pre-processing includes: disregarding data corresponding to one or more web requests deemed not of interest.

In this way, the efficiency and accuracy of the artificial neural network can be improved as computational power is not wasted on considering web requests which are deemed not of interest (e.g. because they are sufficiently rare) that they do not impact the overall processing of the new visitor sessions.

In some cases, the pre-processing performed on the data used to train the artificial neural network will be the same pre-processing that is performed on web requests in accordance with some embodiments of the first aspect of the invention, as described above.

In this way, any web requests whose data is removed from the data used to train the artificial neural network are not embedded to request vectors which impact the processing of a new visitor session in accordance with the first aspect of the invention.

In some examples, it is an administrator of the web-based system who determines if a web request is deemed of interest or not of interest. In other examples, a software programmer who wrote software which implements the method of the second aspect of the invention, determines if a web request is deemed of interest or not of interest. In other examples, the criterion for determining if a web request is deemed of interest or not of interest is predetermined.

Web requests may be deemed not of interest because said web requests are made with a frequency below a predetermined threshold. For example, web requests which are made with a frequency of 1 time a day or less, 1 time a week or less, 10 times a week or less, 1 time in a visitor session or less, 2 times in a visitor session or less, 5 times in a visitor session or less, or 10 times in a visitor session or less, may be disregarded.

In this way the efficiency of the training of the artificial neural network can be increased by not expending processing time or power on web requests which are deemed not of interest.

Preferably, the pre-processing includes: handling web requests which are directed to different content in the web-based system, but are deemed similar such that the artificial neural network will treat the web requests deemed to be similar as if the web requests were directed to the same content.

In this way, the performance of the artificial neural network can be improved by ensuring links between conceptually similar requests are reinforced despite differences, alphanumeric or otherwise, in the syntax of the requests. In other words, variations in the character strings of certain web requests can be neglected by the algorithm if said web requests are thematically linked. This reduces the number of possible web requests considered by the artificial neural network and may help to improve the accuracy of the artificial neural network in determining true causal and/or correlative links between successive web requests.

A skilled person would appreciate there are a variety of ways in which web requests deemed similar could be handled such that the artificial neural network treats the web requests deemed to be similar as if the web requests were directed to the same content.

In general, the criteria by which web requests are deemed to be similar when training the artificial neural network (in a method according to the second aspect of the invention) should be the same as that used when using the trained artificial neural network to generate a session vector (in a method according to the first aspect of the invention). That is, web requests deemed to be similar when training the artificial neural network should, in general, also be deemed similar when using the trained artificial neural network to generate a session vector. This could be implemented in a variety of ways, as would be appreciated by a skilled person.

Examples and general considerations associated with determining whether different web requests might be deemed similar or not similar have already been discussed above.

As noted previously, in some examples, it is an administrator of the web-based system who determines if different web requests are deemed similar or not similar. In other examples, it is a software programmer who wrote software which implements the method of the second aspect of the invention who determines if different web requests are deemed similar or not similar. In some examples, the criterion for determining if different web requests are deemed similar or not similar is predetermined.

In a third aspect of the invention, there may be provided a computer-readable medium having computer-executable instructions configured to cause a computer to perform a method according to the first and/or second aspects of the invention.

In a fourth aspect of the invention, there may be provided a computer configured to perform a method according to the first and/or second aspects of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 3a shows how the learned parameters depicted in FIG. 2 of the trained artificial neural network of FIG. 1 may be arranged into a numerical array.

FIG. 3b shows how each row of the numerical array of FIG. 3a, provides a respective vector, referred to herein as a "request vector".

FIG. 3c shows how each of a plurality of web requests is mapped to a respective request vector.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
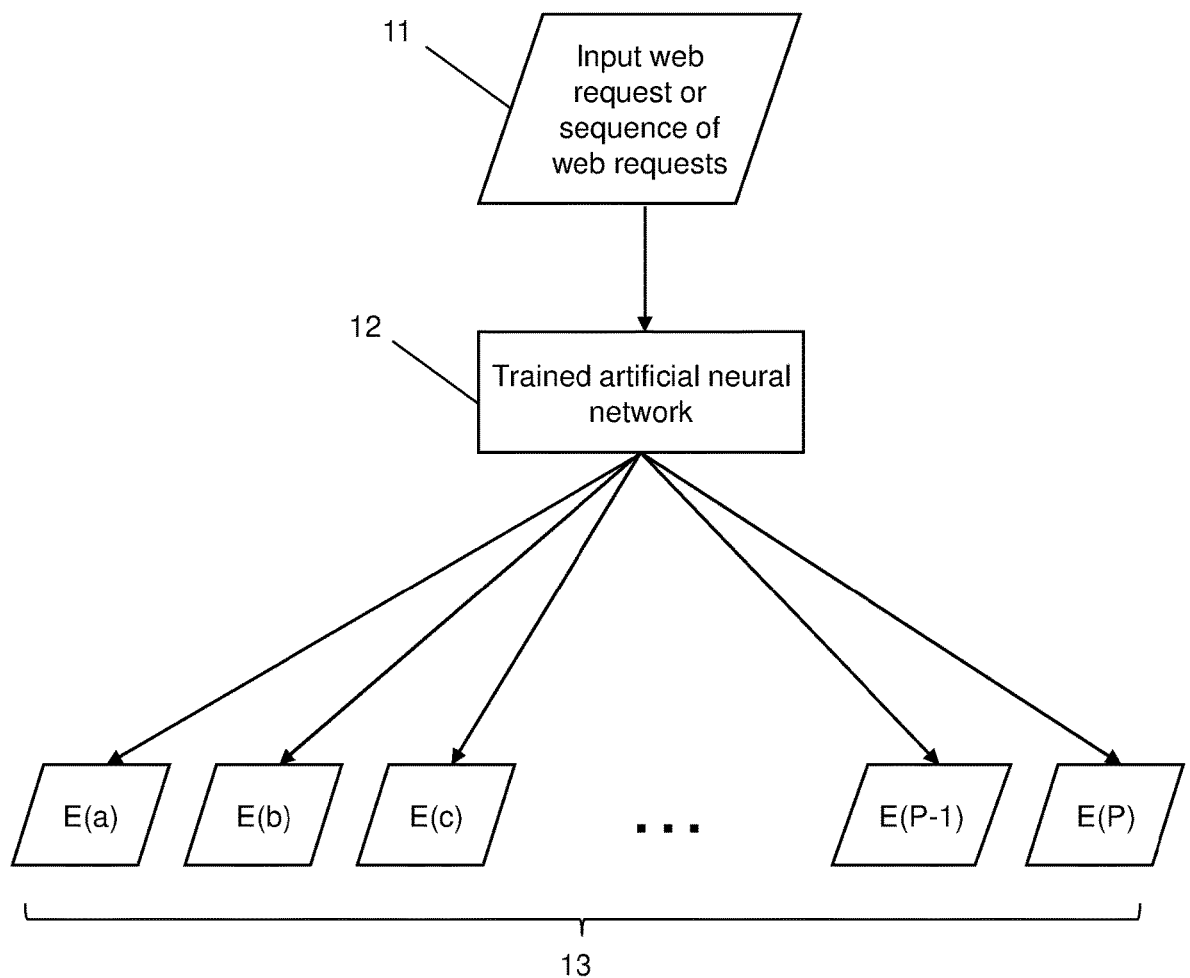
FIG. 1 shows a trained artificial neural network configured to determine a plurality of probabilities from an input web request or an input sequence of web requests.

FIG. 1 shows a trained artificial neural network 12 configured to determine a plurality of probabilities, or expectation values, E(a), E(b), . . . , E(P), 13 from an input web request or an input sequence of web requests 11, wherein each of the plurality of probabilities 13 represents a likelihood that, within a session containing the input web request or sequence of web requests 11, a respective one of P possible web requests will be requested at one or more predetermined locations before or after the input web requests or sequence of web requests 11.

A skilled person would appreciate that there are several possible artificial neural networks each configured to determine alternative results that are possible to implement in accordance with the claimed invention.

For example, it would be possible for the trained neural network 12 to be configured to determine a plurality of probabilities 13 from an input web request 11, wherein each of the plurality of probabilities 13 represents a likelihood that, within a session containing the input web request 11, a respective one of a plurality of possible web requests will be requested at a location that is: immediately after the input web request 11; immediately before the input web request 11; a predetermined number of requests after the input request 11 (e.g. three requests after the input request); a predetermined number of requests before the input request 11 (e.g. two requests after the input request); or within a predetermined number of requests of the input request 11 (e.g. within three requests of the input request, either before or after the input request).

Other examples could easily be envisaged.

What is important, is that the trained artificial neural network 12 is configured to determine probabilities which relate the likelihood of other possible web requests being made in combination (i.e. in a predetermined positional relationship) with respect to the input web request (or input sequence of web requests) 11.

The trained artificial neural network 12 of FIG. 1 is preferably trained using data representing a plurality of visitor sessions to the web-based system. Details of how the trained artificial neural network 12 of FIG. 1 might be trained are provided below.

Here it is noted that the trained artificial neural network 12 of FIG. 1 bears some resemblance to the artificial neural networks typically used in natural language processing ("NLP"), where it is known to use an artificial neural network configured to determine probabilities which relate the likelihood of other possible words being made in combination (i.e. in a predetermined positional relationship) with respect to an input word (or an input sequence of words).

The trained artificial neural network 12 shown in FIG. 1 may be implemented using the Apache Spark™ machine learning libraries (MLib), using word2vec models, for example, skip-gram architectures, such as the one discussed above.

The trained artificial neural network 12 shown in FIG. 1 may thus be designed and trained using techniques known in the field of natural language processing, except with sequences of web requests being used in place of sequences of words.

Figure 2:
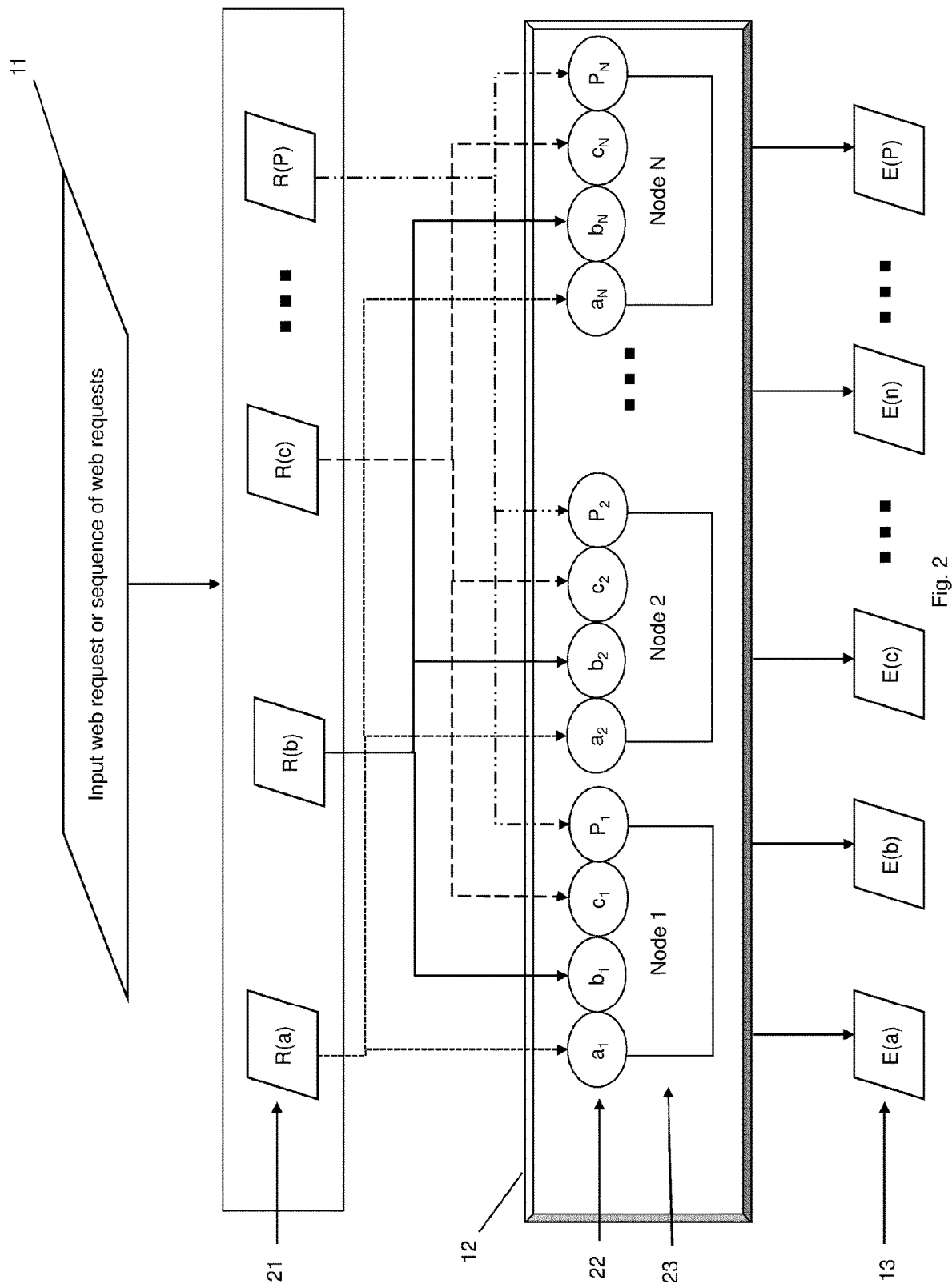
FIG. 2 depicts the weights associated with each node of the trained artificial neural network of FIG. 1.

FIG. 2 depicts the weights 22 associated with each node 23 of the trained artificial neural network 12 of FIG. 1.

The trained artificial neural network 12 comprises a hidden layer of N nodes 23 used to determine the plurality of probabilities 13, where N is a natural number. The weights 22 of the connections between each of the possible input web request vectors 21 and each of the nodes 23 of the trained artificial neural network 12 are considered to be the learned parameters of the trained artificial neural network.

As shown in FIG. 3a, the learned parameters 22 of the trained artificial neural network 12 may be arranged into a numerical array 30. The numerical array 30 is a PxN-dimensional array, wherein P is the number of web requests being considered by the trained artificial neural network 12 as discussed above; and N is the number of nodes within the hidden layer of the trained artificial neural network 12. Each element 22 of the numerical array 30 corresponds to a weight 22 assigned to a connection between a possible input web request 21 and a node 23 in the trained artificial neural network 12.

For the numerical array 30 of FIG. 3a, each row 301 of the array contains values which, for a given web request, provide the weights 22 of the connections between said web request and each of the nodes 23 within the hidden layer of the trained artificial neural network.

For the numerical array 30 of FIG. 3a, each column 302 of the array contains values which, for a given node within the hidden layer of the trained artificial neural network 12, provide the weights 22 of the connections between each of the possible input web requests 21 and said node.

For the numerical array 30 of FIG. 3a, the number of rows 301 is larger than the number of columns 302 of the numerical array 30, corresponding to there being more possible web requests 21 than nodes 23 within the hidden layer of the trained artificial neural network 12.

Thus, as shown by FIGS. 3b and 3c, each row of the numerical array 30 of FIG. 3a provides a respective vector $v_1, v_2, \ldots, v_P$, referred to herein as a "request vector" 32, 34, 36, 38, which is mapped to a respective web request 31, 33, 35, 37. For the numerical array 30 of FIG. 3a, each of the P request vectors 32, 34, 36, 38 of FIG. 3b is an N-dimensional vector, thus inhabiting an N-dimensional vector space, wherein there are fewer dimensions in the vector space than request vectors inhabiting said space.

Note that each request vector $v_1, v_2, \ldots, v_P$ 32, 34, 36, 38 contains values which, for the web request 31, 33, 35, 37 to which it is mapped provide the embedded numerical representation of said web request wherein the embedded numerical representation corresponds to the weights 22 of the connections between said web request and each of the nodes 23 within the hidden layer of the trained artificial neural network 12.

The numerical array 20 is densely populated. In some examples, the array has a density of 0.85 or more, 0.9 or more, 0.95 or more, 0.99 or more, or more preferably 1, wherein the density of an array can be understood to be the fraction of elements of the array which are non-zero.

Figure 4:
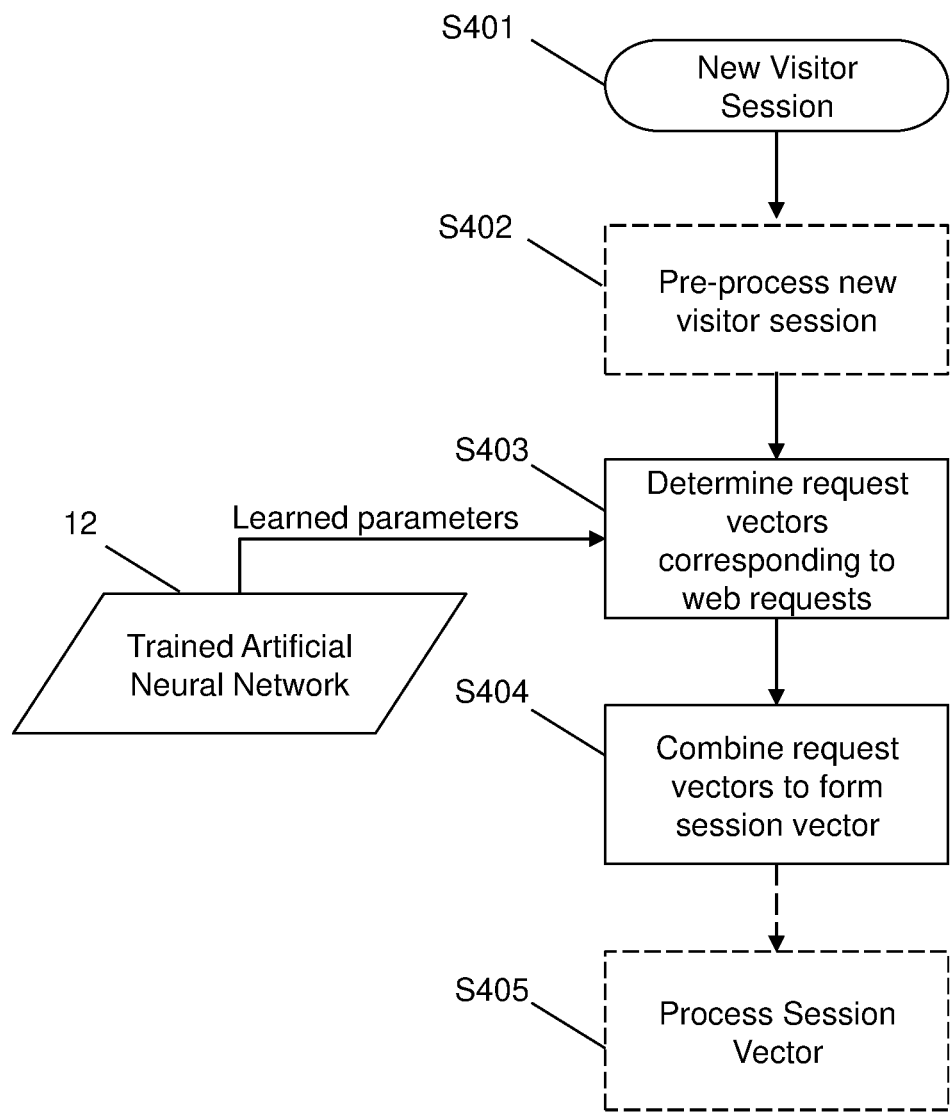
FIG. 4 shows an example method of processing a new visitor session to a web-based system, using the learned parameters of the trained artificial neural network of FIG. 1

FIG. 4 shows an example method of processing a new visitor session to a web-based system, using the learned parameters 22 of the trained artificial neural network 12 of FIGS. 1 and 2.

Preferably, the web-based system to which the method of FIG. 4 is applied is the same as the web-based system on which the trained artificial neural network 12 of FIGS. 1 and 2 was trained.

The method of FIG. 4 includes: optionally, in step S402, pre-processing the new visitor session initiated in step S401; for each of a plurality of web requests 31, 33, 35, 37 made to the web-based system in the new visitor session, determining, in step S403, a request vector 32, 34, 36, 38 corresponding to the web request 31, 33, 35, 37, wherein each request vector 32, 34, 36, 38 is derived from the learned parameters 22 of the trained artificial neural network 12 of FIGS. 1 and 2; combining, in step S404, the request vectors 32, 34, 36, 38 to obtain a session vector which characterizes the new visitor session initiated in step S401; and optionally, in step S405, processing the new visitor session based on the session vector.

In this example, the step S403 of determining a request vector 32, 34, 36, 38 corresponding to a given web request 31, 33, 35, 37 is done using the mapping, or token embedding, shown in FIG. 3c.

In this example the step of combining the request vectors 32, 34, 36, 38 to obtain the session vector is done by averaging all of the request vectors 32, 34, 36, 38.

In other examples, the step of combining the request vectors 32, 34, 36, 38 to obtain the session vector is done by only performing vector addition of all of the request vectors 32, 34, 36, 38.

By way of non-limiting example, only request vectors 32, 34, 36, 38 corresponding to web requests 31, 33, 35, 37 made within a predetermined time period may be combined to obtain the session vector. In other examples all or some other subset of the request vectors 32, 34, 36, 38 may be combined to obtain the session vector. In some examples, only request vectors 32, 34, 36, 38 corresponding to web requests 31, 33, 35, 37 made within the immediately preceding 24 hours are combined to obtain the session vector. In other examples, the predetermined time period is respectively 1 hour, 12 hours, 1 week, 1 month.

The optional pre-processing in step S402 optionally includes, in some examples, disregarding one or more web requests deemed not of interest.

The optional pre-processing in step S402 also optionally includes, in some examples, handling web requests which are directed to different content in the web-based system but are deemed to be similar such that the request vectors corresponding to the web requests deemed to be similar are identical.

In some examples where the pre-processing in step S402 includes disregarding one or more web requests deemed not of interest, disregarding said web requests includes setting their respective request vectors to be null vectors, i.e. vectors whose elements are all equal to zero.

Such pre-processing steps have already been described in detail above.

Figure 5:
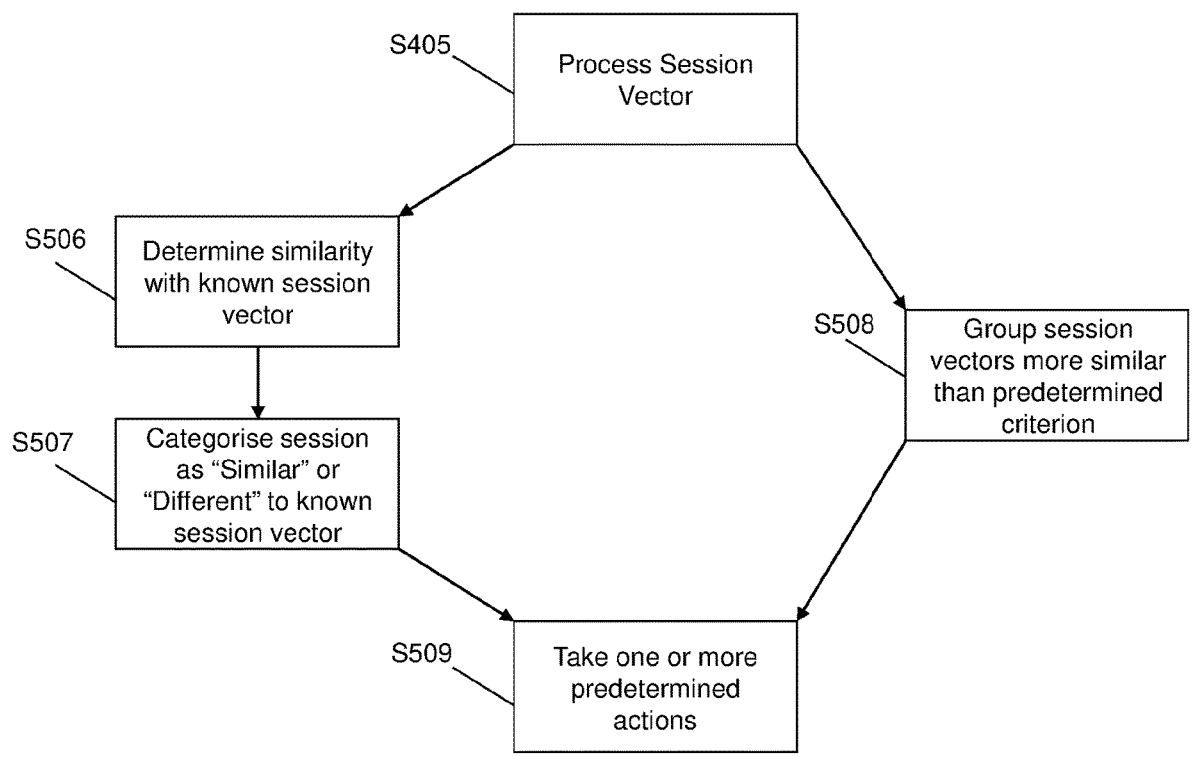
FIG. 5 is a flow chart depicting how the session vector is processed based on the session vector in accordance with some embodiments of the present invention.

FIG. 5 is a flow chart depicting how the session vector is processed based on the session vector, as indicated in step S405, in accordance with some embodiments of the present invention.

In some embodiments and examples of the present invention, processing the session vector involves determining the similarity of the session vector with one or more reference session vectors, as shown in step S506 and discussed below. In some embodiments and examples of the present invention, as shown in step S507, the determination of similarities is used to classify the new visitor session as "Similar" or "Different" to the one or more other visitor sessions which have been respectively embedded to the one or more reference session vectors. In this way, it can be considered that the determination of the similarities is used to determine if the session vector falls within the respective "footprints" of the one or more reference session vectors. The footprint of each of the one or more reference session vectors is the subspace within the vector space inhabited by the session vectors, wherein a session vector occupying said subspace is classified as being "Similar" to the respective reference session vector.

In some examples, one or more of the one or more reference session vectors are session vectors corresponding to visitor sessions which have been identified and, optionally classified, by an administrator of the web-based system.

In some examples, the identified visitor session may be a session wherein the visitor is a "scraper"-a bad actor which scrapes data from a web-based system for gain, commercial or otherwise.

In some examples, the identified visitor session may be a session wherein the visitor is a "bot"-a bad actor which attempts to introduce malware or other cyber-attacks to the web-based system.

In some embodiments and examples of the first aspect of the present invention, processing the session vector involves ranking a plurality of session vectors according to their degree of similarity. In some embodiments and examples, this is done by listing each of the plurality of session vectors in order of decreasing similarity from a reference session vector as discussed below.

In some embodiments and examples of the present invention, processing the session vector involves grouping session vectors together if they fall within the same footprint, or in some examples each other's footprints, as shown in step S508 session vectors are considered to fall within the footprint if the one or more parameters which characterize the similarity between two session vectors is below a predetermined threshold, i.e. if the session vectors are more similar than a predetermined threshold, as discussed below.

In some embodiments and examples of the present invention, the determinations and groupings of steps S506-S508 discussed above are followed by the taking of one or more predetermined actions, in step S509.

In some embodiments and examples of the present invention, one of the one or more predetermined actions is to prompt an administrator of the web-based system to take one or more actions based on the results of the processing of the session vectors as discussed above.

The one or more predetermined actions include, in some examples, delivering one or more targeted messages to the visitor conducting the new visitor session. This may, for example, be a suggestion to include a request for a particular section of the web-based system in the visitor session which an administrator of the web-based system has determined may be of interest to the visitor.

The one or more predetermined actions include, in some examples, one or more security actions. These may include, in some examples, blocking one or more users associated with the new visitor session, or blocking any future session which fall within the footprint of the new visitor session. The one or more security actions include, in some examples, redirecting one or more users associated with the new visitor session through a verification procedure to verify that they are not a "bot".

In some examples, any of the one or more actions which are taken to process the new visitor session based on the session vector are also taken for subsequent visitor sessions which are embedded to other session vectors which fall within the footprint of the session vector.

In some examples, the one or more actions are taken automatically without any manual input from an administrator of the web-based system being required.

Figure 6:
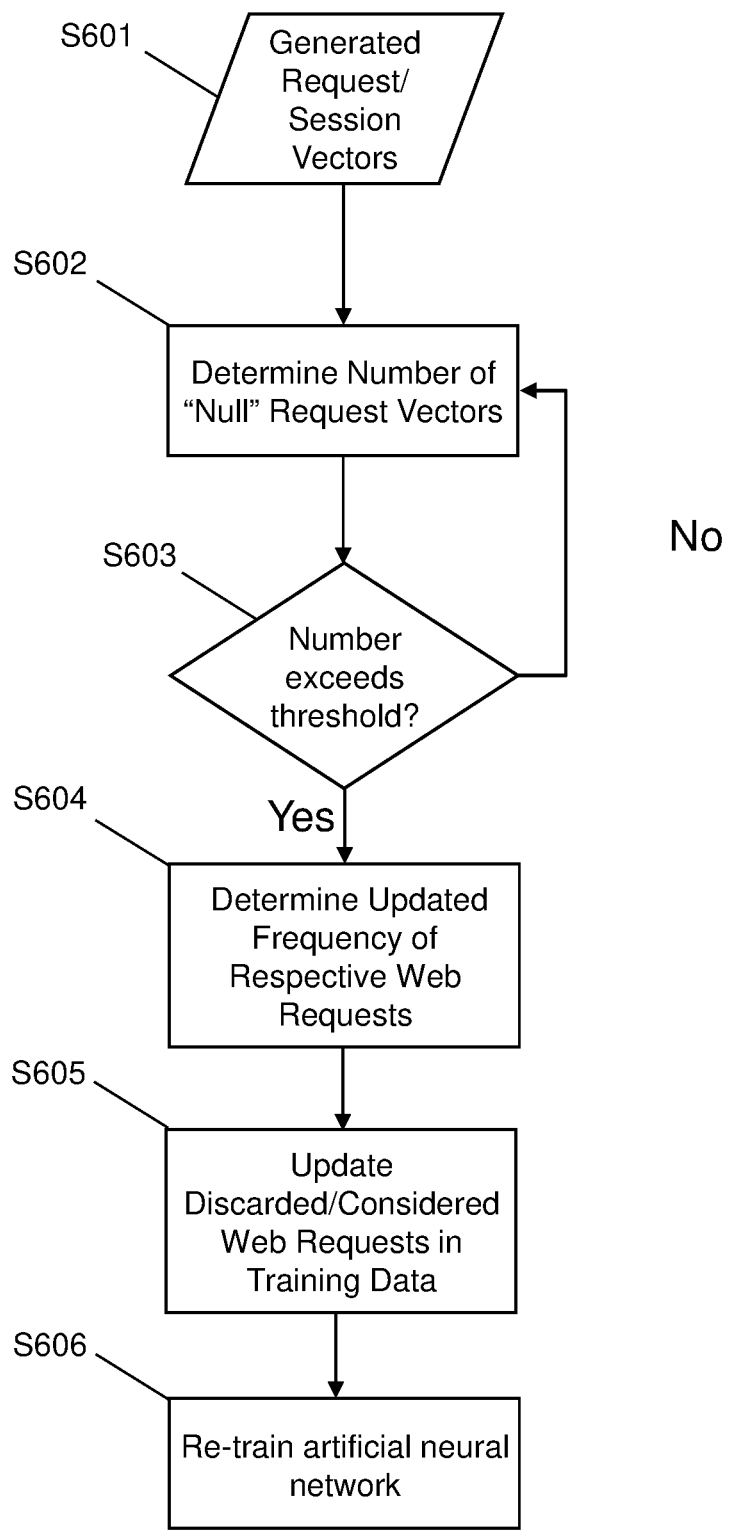
FIG. 6 is a flow chart depicting how the need to retrain the artificial neural network is determined by monitoring the number of "null" request vectors contributing to the session vector, in accordance with some embodiments of the first aspect of the present invention.

In some examples wherein disregarding one or more web requests deemed not of interest includes setting the respectively embedded request vectors to be null vectors, FIG. 6 depicts how the need to retrain the trained artificial neural network 12 is determined by monitoring the number of null request vectors contributing to the session vector.

In some examples where the pre-processing in step S402 of FIG. 4 includes disregarding one or more web requests deemed not of interest, disregarding said web requests includes setting their respective request vectors to be null vectors, i.e. vectors whose elements are all equal to zero.

The method of determining the need for and initiating the re-training of the trained artificial neural network 12 involves providing generated request vectors and/or session vectors as an input in step S601.

In step S602, the number of "null" request vectors included in the one or more request vectors 31, 33, 35, 37 which have been combined to obtain the session vector is determined. In step S603, it is determined if this number exceeds a predetermined threshold.

In some examples, the predetermined threshold is a predetermined proportion of the web requests 31, 33, 35, 37 of the new visitor session over a predetermined period of time, or alternatively over a predetermined number of web requests, being disregarded. In some examples, the predetermined proportion is 5% or more, 10% or more, 20% or more, or 25% or more.

In some examples, the predetermined threshold is a predetermined number of the web requests of the new visitor session being disregarded. In some examples, the predetermined number is 10 or more, 20 or more, 50 or more, or 100 or more.

In some examples, the predetermined threshold is based on a concept drift of visitor sessions. The concept drift can, in some examples, be quantified as a difference between the proportion of web requests of the new visitor session that are disregarded and an average proportion. In some examples, the average proportion is a proportion selected by an administrator of the web-based system, e.g. 5%, 10%, 15%, or 20%. In other examples, the average proportion may be determined by determining the average proportion of web requests from one or more other visitor sessions which were disregarded. The predetermined threshold may be that the concept drift exceeds a factor of, e.g. 2% or more, 5% or more, 10% or more, 15% or more, 20% or more, or 50% or more.

If, in step S603, it is determined that the predetermined threshold is not exceeded, the monitoring of step S602 continues. If, however, it is determined in step S603 that the predetermined threshold is exceeded, the pre-processing of step S402 of FIG. 4 is redone to determine an updated frequency with which each web requests is being requested in a visitor session, in step S604. The determination of the updated frequency is then used to update the web requests which are deemed of interest or not of interest, thus updating the set of web requests which are disregarded as being deemed not of interest, in step S605, by disregarding web requests which are requested with an updated frequency which does not meet a predetermined criterion as discussed above.

In step S606, the updated set of considered and disregarded web requests is then used as a basis to re-train the trained artificial neural network 12, such that it remains up to date with evolving web request patterns and continues to provide learned parameters 22 that are of use in determining request vectors 32, 34, 36, 38 that provide useful information to an administrator of the web-based system when they are combined to obtain a session vector.

The re-training of step S606 may be conducted as described in connection with FIG. 11, below.

Figure 7:
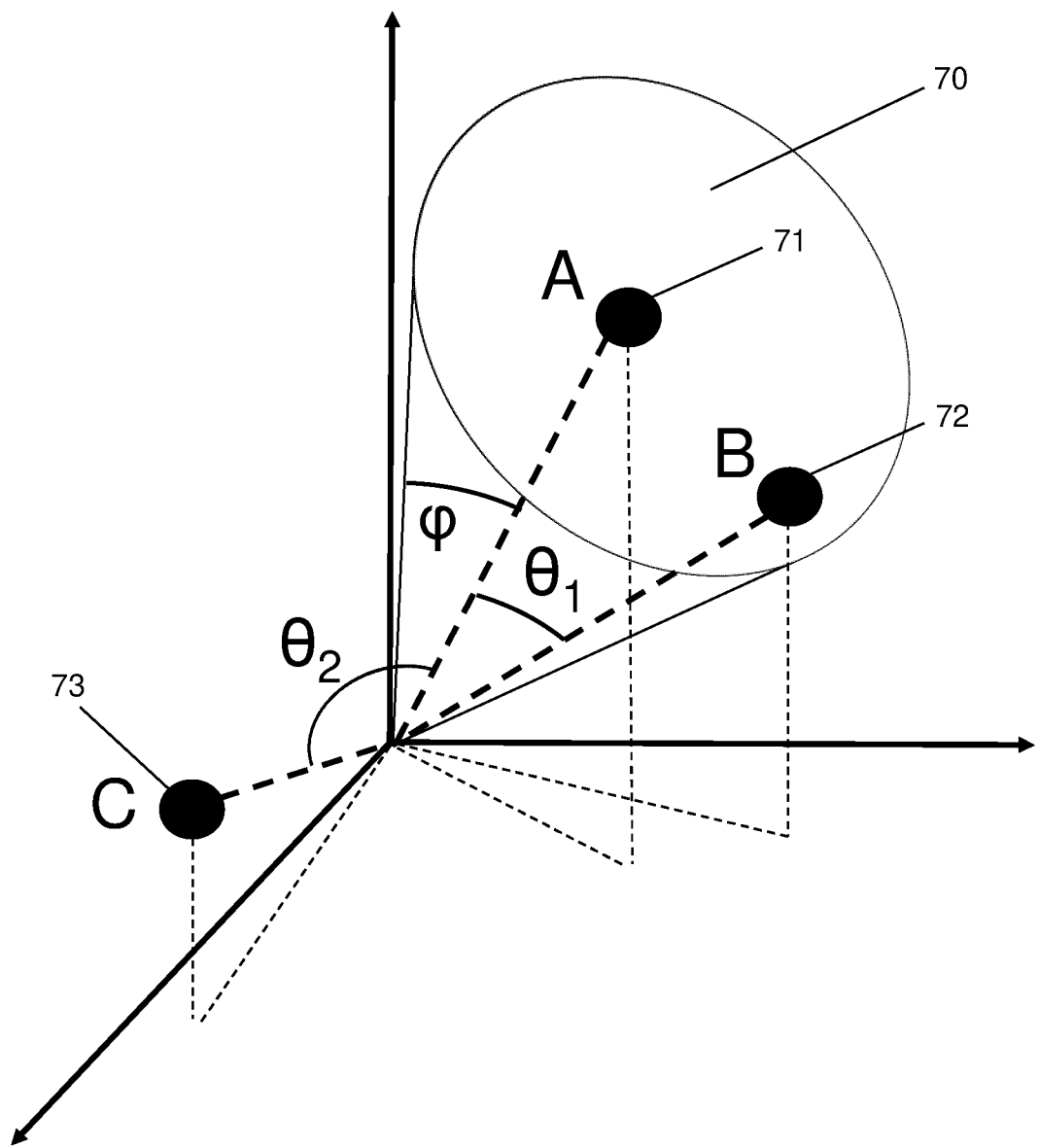
FIG. 7 shows how respective session vectors may lie within or without the "footprint" of a reference session vector, wherein the footprint is defined by a polar geometry.

FIG. 7 shows how respective session vectors may lie within or without the footprint of a reference session vector, wherein the footprint is defined by a polar geometry.

For a new visitor session, a session vector, B, 72 is generated. Meanwhile, for another new visitor session, a session vector, C, 73 is generated. Processing each of these session vectors 72, 73 includes comparing the session vector to a reference session vector, A, 71; wherein comparing each of the session vectors 72, 73 to the reference session vector 71 includes: determining a respective angle $\theta_1$, $\theta_2$ between each of the session vectors 72, 73 and the reference session vector 71. The angles $\theta_1$, $\theta_2$ can be determined by determining the respective cosine similarity between each of the session vectors 72, 73 and the reference session vector 71. The reference session vector 71 has a footprint 70 defined by a cone in the vector space, wherein the cone is defined by having an axis parallel to the reference session vector 71 and a half-angle φ.

In this example, the angle, $\theta_1$, between the session vector, B, 72 and the reference session vector, A, 71 is smaller than the half-angle, φ, of the conic footprint 70. As such, the session vector, B, 72 lies within the footprint 70 of the reference session vector, A, 71 and the visitor session corresponding to said session vector 72 is classified as being "Similar" to the visitor session corresponding to the reference session vector 71.

In contrast, in this example, the angle, $\theta_2$, between the session vector, C, 73 and the reference session vector, A, 71 is larger than the half-angle, φ, of the conic footprint 70. As such, the session vector, C, 73 lies without the footprint 70 of the reference session vector, A, 71 and the visitor session corresponding to said session vector 73 could classified as being "Different" to the visitor session corresponding to the reference session vector 71. Alternatively, it may just be not classified as being "Similar".

Figure 8:
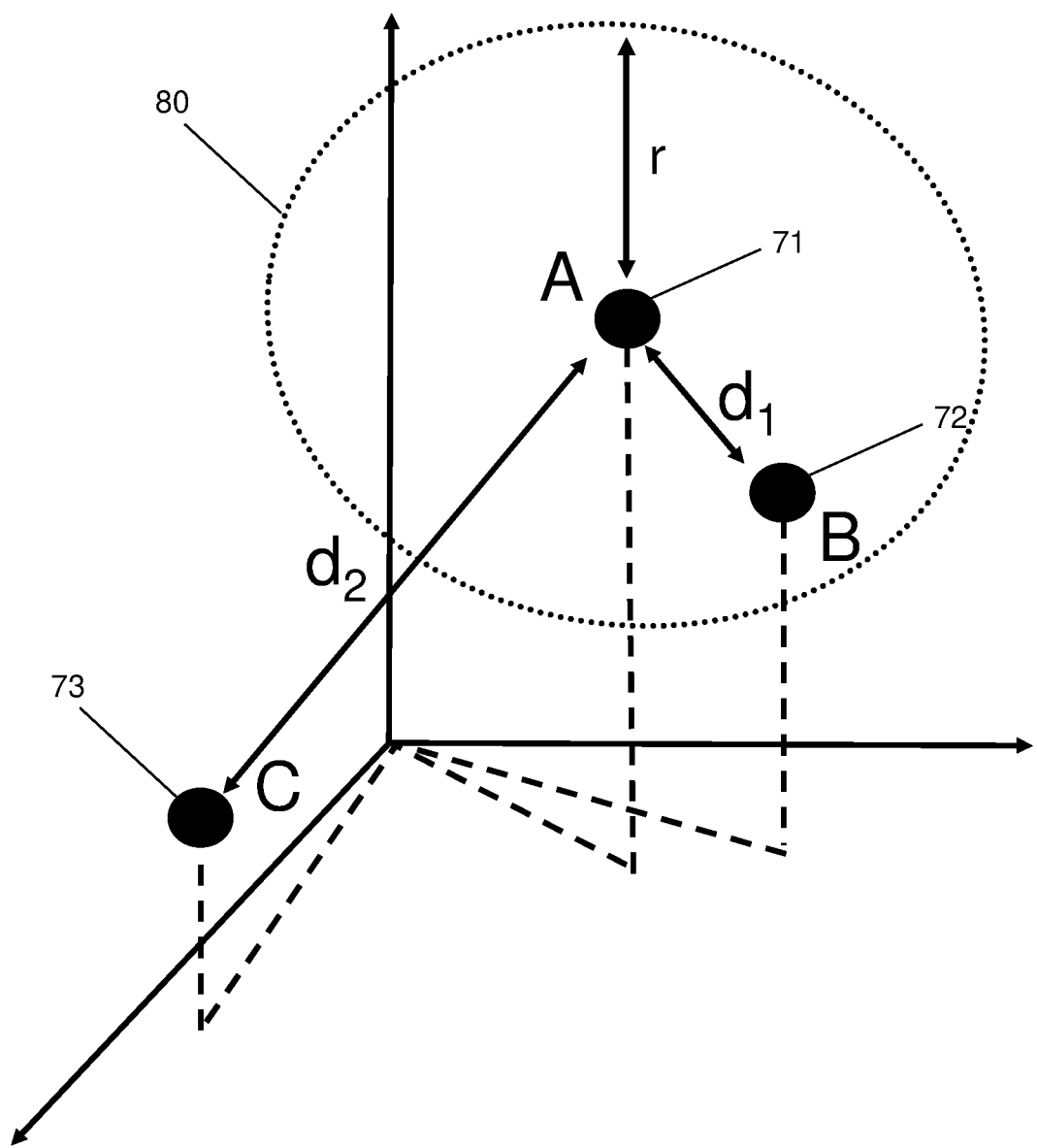
FIG. 8 shows how respective session vectors may lie within or without the "footprint" of a reference session vector, wherein the footprint is defined by a Cartesian geometry.

FIG. 8 shows how respective session vectors may lie within or without the footprint of a reference session vector, wherein the footprint is defined in a Cartesian geometry.

In contrast to the example depicted in FIG. 7, the footprint 80 of the reference session vector, A, 71 is defined by a sphere of radius r, centred on the position of the reference session vector 71.

In this example, processing each of the session vectors Band C 72, 73 includes comparing the session vector to the reference session vector, A, 71, by determining a respective distance $d_1$, $d_2$ between each of the session vectors 72, 73 and the reference session vector 71. The distances $d_1$, $d_2$ can be determined by determining the respective Euclidean distances between each of the session vectors 72, 73 and the reference session vector 71.

In this example, the distance, $d_1$, between the session vector, B, 72 and the reference session vector, A, 71 is smaller than the radius, r, of the spherical footprint 80. As such, the session vector, B, 72 lies within the footprint 80 of the reference session vector, A, 71 and the visitor session corresponding to said session vector is classified as being "Similar" to the visitor session corresponding to the reference session vector 71.

In contrast, in this example, the distance, $d_2$, between the session vector, C, 73 and the reference session vector, A, 71 is larger than the radius, r, of the spherical footprint 80. As such, the session vector, C, 73 lies without the footprint 80 of the reference session vector, A, 71 and the visitor session corresponding to said session vector is classified as being "Different" to the visitor session corresponding to the reference session vector 71. Alternatively, it may just be not classified as being "Similar".

The visitor session corresponding to the reference session vector 71 in FIGS. 7 and 8 may be, for example, a visitor session which has already been processed in accordance with any of the embodiments and examples described herein. In other examples, the visitor session corresponding to the reference session vector 71 may be a visitor session created to be representative of a particular category of visitor session. In other examples, the visitor session corresponding to the reference session vector 71 may be a representation of the average behaviour of a plurality of new visitor sessions which are categorised to be similar, in accordance with some of the embodiments and examples discussed above.

Figure 9:
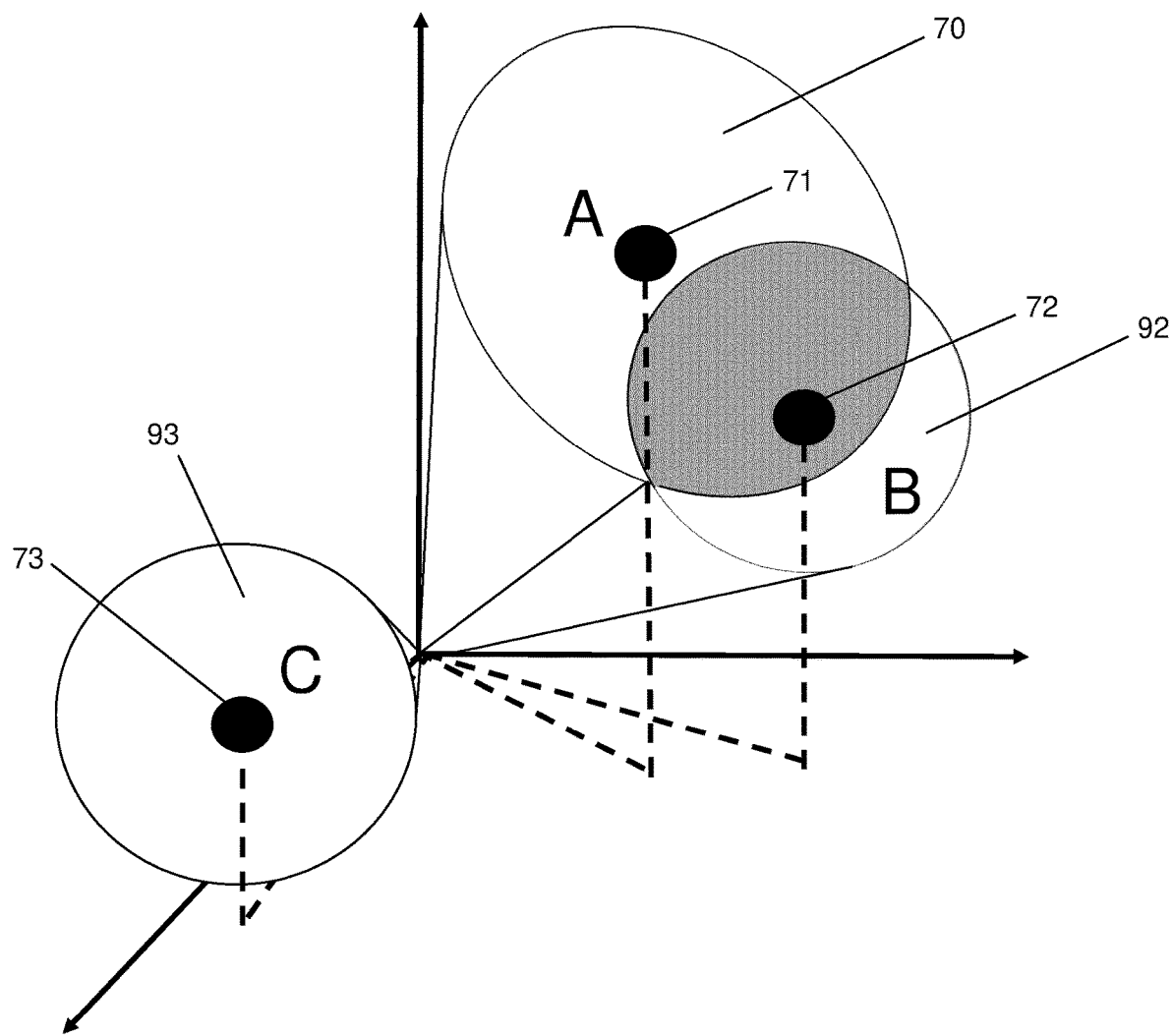
FIG. 9 shows a schematic of the footprints of example session vectors in a polar geometry.

FIG. 9 shows a schematic of the footprints of a plurality of example session vectors in a polar geometry.

Figure 10:
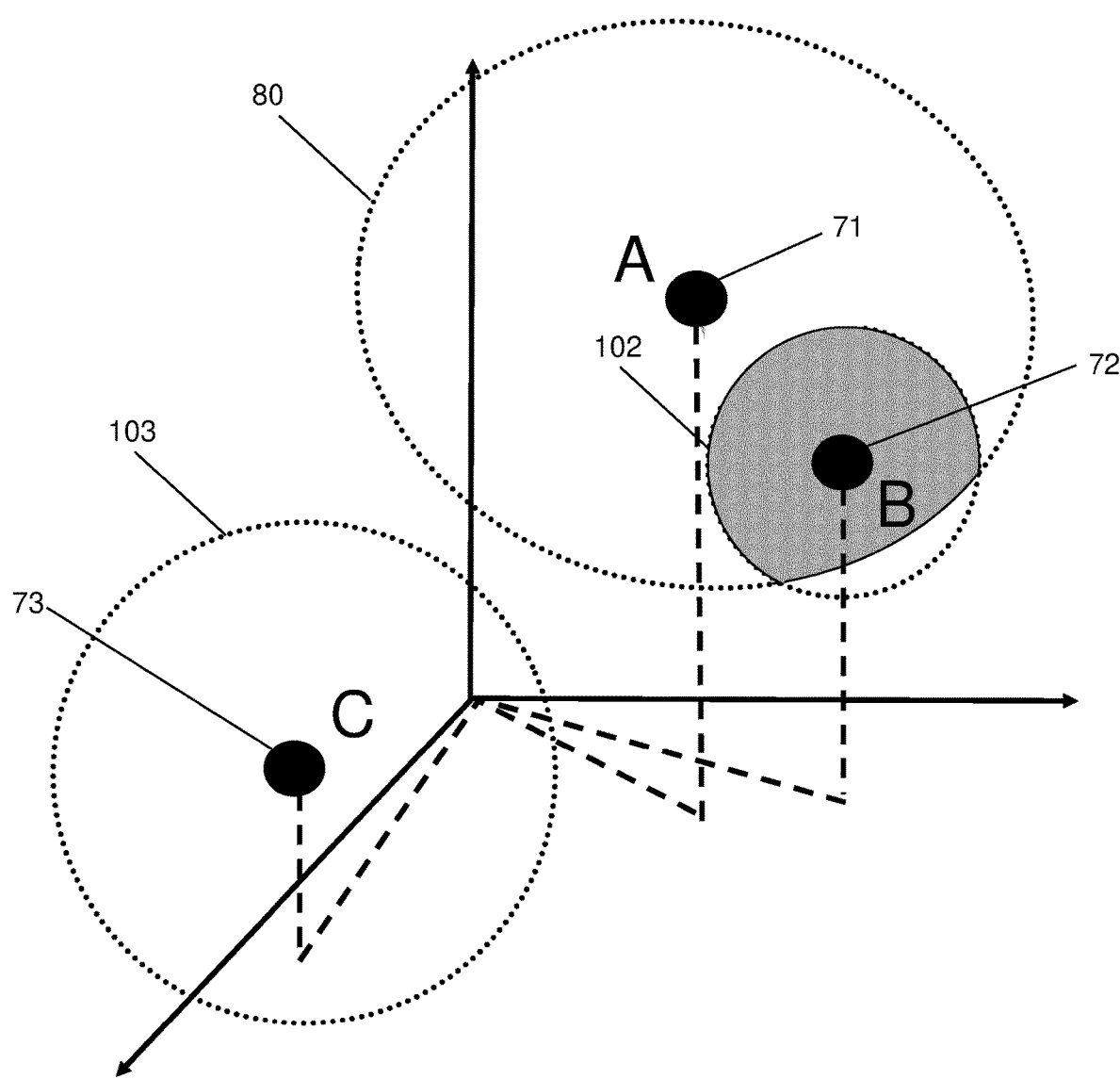
FIG. 10 shows a schematic of the footprints of example session vectors in a Cartesian geometry.

FIG. 10 shows a schematic of the footprints of a plurality of example session vectors in a Cartesian geometry In accordance with some embodiments and examples of the present invention, each session vector 71, 72, 73 obtained by processing a new visitor session may have its own respective footprint 70, 92, 93; 80, 102, 103. As depicted in FIGS. 9 and 10, one or more of these footprints 70, 92; 80, 102 may mutually occupy a common region of the vector space. In some examples, session vectors 71, 72 whose footprints 70, 92; 80, 102 mutually occupy a common region of the vector space are grouped together and classified such that visitor sessions whose session vectors are grouped are classified as belonging to the same group. In some examples, session vectors 73 whose footprints 93; 103 do not mutually occupy a region of vector space with the footprints 70, 92; 80, 102 of another session vector 71, 72 are not grouped as described above.

In some examples, as can be seen from FIGS. 9 and 10, footprints 70, 92, 93; 80, 102, 103 corresponding to different session vectors 71, 72, 73 are not necessarily the same size. In other words the criterion for determining if a new visitor session is "Similar" to each of the respective visitor sessions corresponding to each of the session vectors 71, 72, 72 is different for each respective visitor session. In some examples, the size of the footprint 70, 92, 93; 80, 102, 103 for each session vector 71, 72, 73 is determined manually by an administrator of the web-based system. In some examples, the size of the footprint 70, 92, 93; 80, 102, 103 for each session vector 71, 72, 73 is determined by a software programmer who writes computer software to implement the method of the claimed invention.

In this way, each of the plurality of session vectors 71, 72, 73 can be considered to have its own footprint within the vector space such that any new visitor sessions represented by session vectors that fall within the footprint of any of the plurality of session vectors 71, 72, 73 can be classified as being similar to each of the respective visitor sessions corresponding to each of the plurality of session vectors 71, 72, 73.

In some embodiments and examples of the invention, information corresponding to the determinations of the respective similarities between the session vector and each of the one or more other session vectors is presented to an administrator of the web-based system via a graphical user interface (GUI). In some examples, the GUI is used to notify the user that the session vector is similar and/or different to one or more of the one or more other session vectors. In some examples, the GUI is further configured such that it enables an administrator of the web-based system to take one or more predetermined actions. The one or more predetermined actions includes one or more security actions. The one or more security actions includes, for examples, "block any more users in this footprint" and/or "allow any users in this footprint".

Figure 11:
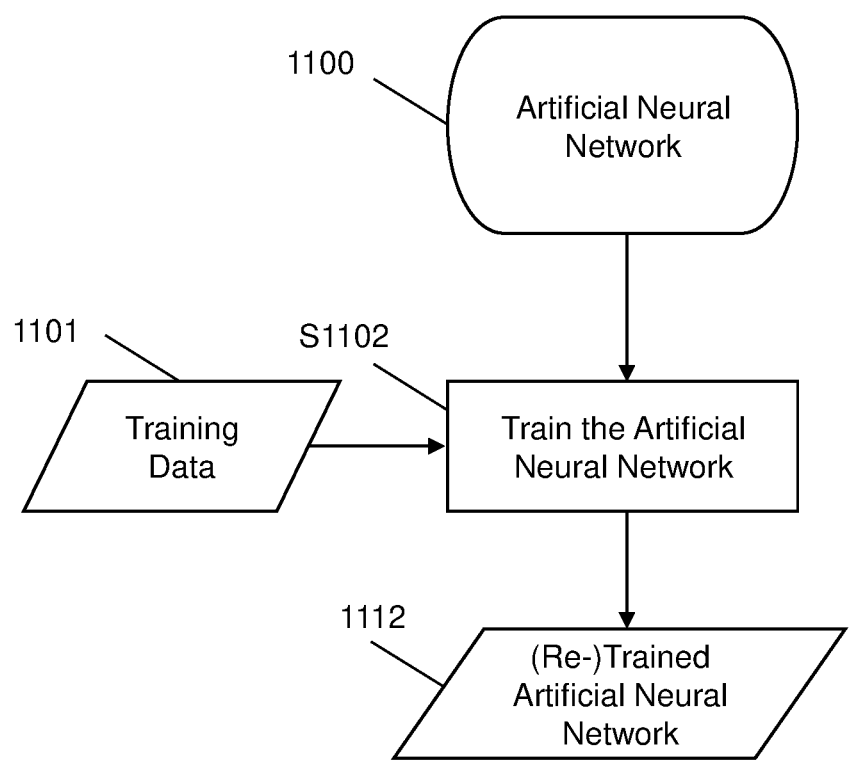
FIG. 11 is a flow chart depicting the training of the artificial neural network of FIG. 1.

FIG. 11 is a flow chart depicting the training or re-training of an artificial neural network, e.g. the artificial neural network 12 of FIG. 1.

Firstly, there is provided an artificial neural network 1100, and training data 1101. The training data 1101 is used to train or re-train the artificial neural network 1100 in step S1102, resulting in the trained artificial neural network 1112.

The artificial neural network S1100 may be an untrained artificial network, or a previously trained artificial neural network that requires retraining, e.g. according to the method of FIG. 6.

Training the neural network 1100 may involve adjusting the relative weights of each node 22 in each of the one or more hidden layers of nodes until the process of determining the plurality of probabilities 13 achieves an accuracy above a predetermined threshold.

Training an artificial neural network to determine a plurality of probabilities in this way conventionally implements skip-gram architectures, of which the skilled person would be aware.

In some examples, the artificial neural network is trained by implementing a machine learning algorithm, using the training data, for one or more training iterations. In some examples, the number of training iterations is 1 or more, 5 or more, 10 or more. In some examples, the training of the artificial neural network is reiterated until the accuracy of the artificial neural network meets a predetermined criterion. In some examples, the predetermined criterion is an accuracy threshold such that the training of the artificial neural network is deemed to be complete once the accuracy of the artificial neural network is above a predetermined threshold. In other examples, the predetermined criterion is that the error of the artificial neural network is determined to have been reduced to a minimum. In other words, the predetermined criterion may be that the accuracy of the artificial neural network is determined to have been increased to a maximum. In some examples, the accuracy of the artificial neural network may be deemed to have been increased to a maximum, if the accuracy of the artificial neural network does not increase for a predetermined number of iterations. The predetermined number of training iterations may be 1 or more, 2 or more, 5 or more, 10 or more. In some examples, the accuracy of the artificial neural network may be deemed to have been increased to a maximum if the artificial neural network meets a predetermined convergence criterion. The convergence criterion may be for example, that the derivative of the accuracy of the artificial neural network with the number of training iterations falls below a predetermined threshold.

The artificial neural network may be an untrained artificial neural network configured to determine a plurality of probabilities 13 from an input web request or sequence of web requests 11, wherein each of the plurality of probabilities 13 represents a likelihood that, within a session containing the input web request or sequence of web requests 11, a respective one of a plurality of possible web requests will be requested at one or more predetermined locations before or after the input web request or sequence of web requests 11.

The training data 1101 is data that may represent a plurality of visitor sessions to the web-based system.

In some examples, pre-processing is performed which includes one or more of: disregarding data corresponding to one or more web requests deemed not of interest; and identifying web requests which are directed to different content in the web-based system, but are deemed similar, and manipulating the data corresponding to the web requests that have been identified as similar such that the artificial neural network will treat the identified web request as if the web requests were directed to the same content, as discussed above.

If the trained artificial neural network 1112 is to be used in the method of FIG. 4, then the pre-processing of a new visitor session in step S402 preferably corresponds to the pre-processing performed as part of the training data, as previously described.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of processing a new visitor session to a web-based system,
   the method including:
   for each of a plurality of web requests made to the web-based system in the new visitor session, determining a request vector corresponding to the web request,
   wherein each request vector is derived from a plurality of learned parameters of a trained artificial neural network configured to determine a plurality of probabilities from an input web request or an input sequence of web requests,
   wherein the plurality of learned parameters are a plurality of weights of connections between each of a plurality of possible input web requests and each of a plurality of nodes of the trained artificial neural network,
   wherein the plurality of learned parameters are extracted from the trained artificial neural network and arranged into a numerical array,
   wherein each request vector is derived by extracting a respective row or column of the numerical array, and
   wherein each of the plurality of probabilities represents a likelihood that a respective other possible web request be made in combination with the input web request or input sequence of web requests within a session; and
   combining the request vectors to obtain a session vector which characterizes the new visitor session.

2. The method of claim 1, wherein combining the request vectors to obtain a session vector which characterizes the new visitor session includes:
   adding the request vectors together.

3. The method of claim 1, wherein the method further includes:
   updating the session vector with new request vectors corresponding to new web requests made in the new visitor session.

4. The method of claim 1, wherein the method further includes:
   pre-processing web requests in the new visitor session by disregarding one or more web requests deemed not of interest.

5. The method of claim 4, wherein disregarding a web request deemed not of interest involves setting the request vector for the web request to be a null vector.

6. The method of claim 4, wherein the method further includes:
monitoring disregarded web requests; and
initiating a retraining of the artificial neural network based on the monitoring of the disregarded web requests.

7. The method of claim 1, wherein the method further includes:
pre-processing web requests in the new visitor session by handling web requests which are directed to different content in the web-based system, but are deemed to be similar such that the request vectors corresponding to the web requests deemed to be similar are identical.

8. The method of claim 1, wherein the method further includes:
processing the new visitor session based on the session vector.

9. The method of claim 8, wherein processing the new visitor session includes comparing the session vector to a reference session vector corresponding to another visitor session, wherein comparing the session vector to the reference session vector includes:
determining one or more parameters indicative of the similarity between the session vector and the reference session vector; and
if the determined one or more parameters meets a predetermined criterion indicating that the session vector and reference session vector are adequately similar, identifying the new visitor session as being similar to the other visitor session.

10. The method of claim 9, wherein processing the new visitor session includes taking one or more predetermined actions in response to further web requests in the new visitor session, based on the new visitor session being identified as similar to the other visitor session.

11. The method of claim 1, wherein processing the new visitor session further includes:
determining one or more parameters indicative of the similarity between the session vector and each of a plurality of reference session vectors, wherein each of the plurality of reference session vectors corresponds to a respective other visitor session; and
grouping the new visitor session with each other visitor session for which the respective one or more determined parameters meets a predetermined criterion indicating that the session vector and the reference session vector corresponding to that other visitor session are adequately similar.

12. The method of claim 1, wherein processing the new visitor session further includes:
providing a graphical user interface configured to present information regarding the new visitor session to a user, wherein the information regarding the new visitor session is based at least in part on the session vector.

13. The method of claim 12, wherein the wherein the graphical user interface is further configured to:
if the new visitor session has been processed based on the session vector, inform the user of the graphical user interface how the new visitor session has been processed based on the session vector.

14. The method of claim 1, wherein the method is performed for each of a plurality of new visitor sessions to the web-based system to obtain a respective session vector which characterizes each of the plurality of new visitor sessions.

\* \* \* \* \*